US012770162B2

(12) United States Patent
Jayaraman

(10) Patent No.: US 12,770,162 B2
(45) Date of Patent: Oct. 20, 2026

(54) GUI PROCESSING AND GENERATION SYSTEMS FOR VISUAL USER INTERFACE DEPICTION AND IMPROVEMENT EXPLANATION

(71) Applicant: Barath Jayaraman, Fort Mill, SC (US)

(72) Inventor: Barath Jayaraman, Fort Mill, SC (US)

(73) Assignee: Jayaraman IP LLC, Fort Mill, SC (US)

( * ) Notice: Subject to any disclaimer, the term of this patent is extended or adjusted under 35 U.S.C. 154(b) by 0 days.

(21) Appl. No.: 18/750,935

(22) Filed: Jun. 21, 2024

(65) Prior Publication Data

US 2025/0390905 A1 Dec. 25, 2025

(51) Int. Cl.

*G06Q 30/0207* (2023.01)
*G06F 9/451* (2018.01)
*G06Q 20/34* (2012.01)
*G06Q 20/36* (2012.01)

(52) U.S. Cl.

CPC ......... *G06Q 30/0215* (2013.01); *G06F 9/451* (2018.02); *G06Q 20/34* (2013.01); *G06Q 20/3674* (2013.01)

(58) Field of Classification Search

None

See application file for complete search history.

(56) References Cited

U.S. PATENT DOCUMENTS 5,352,155 A * 10/1994 Fahey ....................... B41L 1/22 283/81
5,531,482 A * 7/1996 Blank .................. G06Q 20/342 283/67

(Continued)

FOREIGN PATENT DOCUMENTS

EP 1507229 A1 * 2/2005 ....... G06K 19/06046
WO WO-03034329 A1 * 4/2003 ............ B41J 3/4075

OTHER PUBLICATIONS

Myl3monlim3, "I made category stickers for my credit cards to help me maximize my rewards," retrieved from https://www.reddit.com/r/Frugal/comments/ay77pw/i_made_category_stickers_for_my_credit_cards_to/ on Mar. 6, 2019 (Year: 2019).*

(Continued)

*Primary Examiner* — Eduardo Castilho

(74) *Attorney, Agent, or Firm* — Heslin Rothenberg Farley & Mesiti P.C.; Matthew M. Hulihan, Esq.

(57) ABSTRACT

Systems and methods access stored object information of a tangible object associated with a user account of a user, the stored object information being stored to data storage location(s) and indicating parameters associated with use of the tangible object. Parameter(s) are ascertained from the stored object information, with at least one parameter including benefit(s) available to the user upon use of the tangible object. Customized interface content to be depicted via a GUI of the user device is generated, where the customized interface content represents a virtual depiction of the tangible object and at least one of the benefit(s) available upon use of the tangible object. Display of the customized interface content via the GUI of the user device is initiated, where the customized interface content depicts at least one of the benefit(s) as part of a design of the virtual depiction of the tangible object.

13 Claims, 18 Drawing Sheets

(56) References Cited

U.S. PATENT DOCUMENTS

| | | | | |
|---|---|---|---|---|
| 6,902,107 | B2 * | 6/2005 | Shay | G06K 17/00 235/381 |
| 10,636,020 | B1 * | 4/2020 | Crawford | G06Q 20/355 |
| 11,216,837 | B2 * | 1/2022 | Hunter | G06Q 30/0222 |
| 11,315,179 | B1 * | 4/2022 | Rehder | G06Q 30/0226 |
| 11,423,384 | B1 | 8/2022 | Philbrick et al. | |
| 11,423,432 | B2 * | 8/2022 | Yucra Rodriguez | G06Q 30/0232 |
| 11,948,150 | B1 * | 4/2024 | Chigurupati | G06Q 20/3821 |
| 2001/0034717 | A1 * | 10/2001 | Whitworth | G06Q 20/385 713/168 |
| 2004/0133846 | A1 * | 7/2004 | Khoshatefeh | G06F 40/166 715/208 |
| 2005/0058427 | A1 * | 3/2005 | Nguyen | G07F 7/122 386/362 |
| 2005/0230960 | A1 * | 10/2005 | Bilodeau | G09F 3/0292 283/75 |
| 2007/0215699 | A1 * | 9/2007 | Arego | G06Q 30/06 235/380 |
| 2008/0100057 | A1 * | 5/2008 | MacPhee | G09F 3/10 283/101 |
| 2009/0173783 | A1 * | 7/2009 | Fomitchev | G07F 7/1008 235/380 |
| 2010/0017279 | A1 * | 1/2010 | Connor, Jr. | G06Q 30/0229 705/14.3 |
| 2010/0036721 | A1 * | 2/2010 | Fatt | G06Q 30/0211 705/14.27 |
| 2010/0191570 | A1 * | 7/2010 | Michaud | G06Q 30/02 705/14.27 |
| 2011/0022448 | A1 | 1/2011 | Strock et al. | |
| 2011/0022712 | A1 * | 1/2011 | Numaoka | G06F 9/505 709/226 |
| 2012/0031545 | A1 * | 2/2012 | Vaccaro | G09F 3/10 156/387 |
| 2012/0122520 | A1 * | 5/2012 | Phillips | H04M 1/21 455/556.2 |
| 2013/0118042 | A1 * | 5/2013 | Keys | G09F 3/00 715/810 |
| 2014/0180826 | A1 * | 6/2014 | Boal | G06Q 30/0269 705/14.66 |
| 2015/0079326 | A1 * | 3/2015 | Snow | G09F 3/02 428/40.1 |
| 2015/0302383 | A1 | 10/2015 | Mills et al. | |
| 2016/0086222 | A1 * | 3/2016 | Kurapati | G06Q 40/08 705/14.53 |
| 2016/0225011 | A1 * | 8/2016 | Shah | G06Q 20/387 |
| 2016/0350792 | A1 * | 12/2016 | Rajappa | G06Q 30/0236 |
| 2017/0091765 | A1 | 3/2017 | Lloyd et al. | |
| 2017/0116635 | A1 | 4/2017 | Gantert et al. | |
| 2017/0320335 | A1 * | 11/2017 | Wooldridge | B41J 13/12 |
| 2018/0358124 | A1 * | 12/2018 | Scheuer | G16H 10/65 |
| 2020/0257408 | A1 | 8/2020 | Yoshida | |
| 2021/0027357 | A1 * | 1/2021 | Bonfigli | G06Q 30/0224 |
| 2021/0065279 | A1 * | 3/2021 | Mupkala | G06Q 30/0224 |
| 2021/0117988 | A1 * | 4/2021 | Kresge | G06Q 40/02 |
| 2021/0125140 | A1 * | 4/2021 | Kim | H04N 21/4622 |
| 2021/0142353 | A1 * | 5/2021 | Jogani | G06Q 30/0224 |
| 2021/0192496 | A1 * | 6/2021 | Gregovic | G06Q 20/3278 |
| 2021/0264467 | A1 | 8/2021 | Boal | |
| 2021/0406923 | A1 | 12/2021 | Cherry et al. | |
| 2022/0051286 | A1 * | 2/2022 | Bharakhada | G06Q 30/0239 |
| 2022/0076288 | A1 * | 3/2022 | Dey | G06Q 30/0239 |
| 2022/0101375 | A1 * | 3/2022 | Moreno | G06Q 30/0254 |
| 2022/0358487 | A1 | 11/2022 | Garner et al. | |
| 2023/0376935 | A1 * | 11/2023 | Jeyaseelan Arockiaraj | G06Q 20/34 |
| 2024/0351349 | A1 * | 10/2024 | Marquardt | B41J 3/4075 |
| 2025/0148491 | A1 * | 5/2025 | Yoon | G06Q 30/0251 |

OTHER PUBLICATIONS

Phyraverse, “Category Stickers for my Cards to better keep track of what to use,” retrieved from https://www.reddit.com/r/amex/comments/14omi7o/category_stickers_for_my_cards_to_better_keep/ on Jul. 2, 2023 (Year: 2023).*

International Search Report and Written Opinion for PCT/US2025/032254, dated Aug. 19, 2025. 19 pgs.

International Search Report and Written Opinion for PCT/US2025/032256 dated Aug. 20, 2025. 12 pgs.

Non-Final Office Action received for U.S. Appl. No. 18/751,898 dated Sep. 18, 2025. 23 pgs.

* cited by examiner

GUI PROCESSING AND GENERATION SYSTEMS FOR VISUAL USER INTERFACE DEPICTION AND IMPROVEMENT EXPLANATION

FIELD OF THE INVENTION

This invention relates generally to the field of processing and generation systems, and more particularly embodiments of the invention relate to systems and methods for providing information via the processing and generation systems.

BACKGROUND OF THE INVENTION

Users often overlook benefits associated with their cards, and existing methods used to communicate information associated with the benefits may be inefficient and inaccessible. Thus, disclosed herein are improved systems and methods for improving user accessibility to benefit information, thereby increasing user awareness of benefits, increasing card utilization, and improving user satisfaction.

BRIEF SUMMARY

Shortcomings of the prior art are overcome and additional advantages are provided through the provision of a computing system for interface content processing and generation for GUI depiction. The computing system includes at least one processor, a communication interface communicatively coupled to the at least one processor, and a memory device storing executable code. When executed, the executable code causes the at least one processor to, at least in part, access stored object information of a tangible object associated with a user account of a user, the stored object information being stored to one or more data storage locations and indicating parameters associated with use of the tangible object. Further, at least one parameter of the parameters associated with use of the tangible object is ascertained from the stored object information, where the at least one parameter includes one or more benefits available to the user upon use of the tangible object or a virtual version of the tangible object, wherein the use of the tangible object facilitates a resource exchange from the user account to an external location. Customized interface content to be depicted via a GUI of the user device is generated, where the customized interface content represents (i) a virtual depiction of the tangible object, and (ii) at least one of the one or more benefits available to the user upon use of the tangible object or the virtual version of the tangible object. In addition, display, via the GUI of the user device, of the customized interface content is initiated, where the customized interface content depicts the at least one of the one or more benefits as part of a design of the virtual depiction of the tangible object.

Also disclosed herein is a computing system for tangible object design generation. The computing system includes at least one processor, a communication interface communicatively coupled to the at least one processor, and a memory device storing executable code. Execution of the executable code causes the processor to, at least in part, generate a design for depiction on a tangible object, the design depicting one or more benefits that are automatically earnable upon use, by a user, of the tangible object or a virtual version of the tangible object, the one or more benefits being attributed to a user account of the user. Further, one or more control signals are generated to one or more computing device to initiate production and distribution of the design for depiction on the tangible object.

Also disclosed herein is a method that includes generating a design for depiction on a physical card, the design depicting one or more benefits that are automatically earnable upon use, by a user, of the physical card, the one or more benefits being attributed to a user account of the user, wherein the physical card facilitates a resource exchange from a user account of the user to an external location. The method also includes transmitting one or more control signals to one or more computing devices to initiate production and distribution of the design for depiction on the tangible object.

A computer-implemented is also disclosed herein that includes ascertaining, from stored object information associated with a physical card that is associated with a user account of a user, at least one parameter of parameters indicated by the stored object information, the at least one parameter including one or more benefits available upon use of the physical card or a virtual version of the tangible object. The method also includes generating customized interface content to be depicted via a GUI of the user device, the customized interface content representing (i) a virtual depiction of the physical card, and (ii) at least one of the one or more benefits available upon use of the physical card or a virtual version of the physical card. Further, the method includes initiating display, via the GUI of the user device, of the customized interface content, wherein the customized interface content depicts the at least one of the one or more benefits as part of a design of the virtual depiction of the physical card.

In addition, a computer-implemented method is also disclosed that includes receiving, by a user device, benefit information associated with using a card, the benefit information being derived from stored information associated with a product or service obtained by using the card. The benefit information is displayed via a user interface of the user device and during a user action that incorporates usage of the physical card, where the benefit information is displayed prior to using the card to obtain the product or service, and the benefit information is displayed via a digital wallet application usable via the user device.

Various features disclosed herein as methods and systems may be achieved by combining in different embodiments, the details of which can be seen with reference to the following description and drawings.

BRIEF DESCRIPTION

The claims at the conclusion of the specification particularly point out and distinctly claim features and advantages of the systems and methods disclosed herein. Various objects, features, and advantages are provided in the following description in conjunction with the accompanying drawings in which:

DETAILED DESCRIPTION

Figure 1:
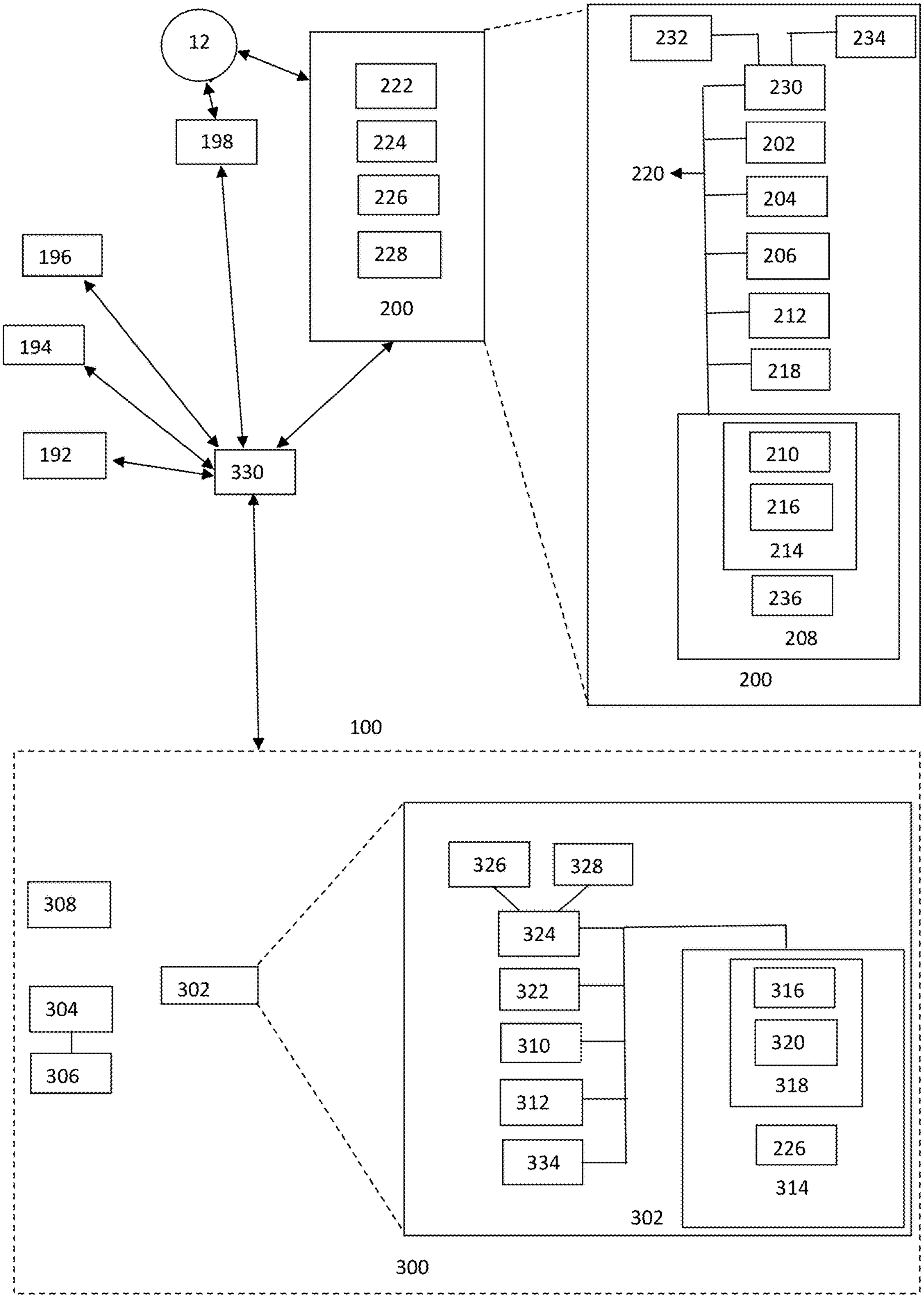
FIG. 1 illustrates a schematic representation of an enterprise system and its environment, in accordance with an embodiment of the present invention.

Certain features, advantages, and details of the present invention are explained more fully below with reference to the non-limiting examples illustrated in the accompanying drawings. The detailed description provides several non-limiting embodiments for illustration purposes only. The scope of the invention allows for substitutions, modifications, and/or additions as would be apparent to those skilled in the relevant art. For clarity, each disclosed aspect or feature is combinable with any other disclosed aspect or feature disclosed herein. Recurring elements are denoted consistently for clarity. Unless described or implied as exclusive alternatives, aspects described herein are cumulative such that features expressly associated with particular embodiments are combinable with other embodiments. Terminology and scientific notations deployed are congruent with conventional interpretations by professionals in the relevant domain, unless otherwise delineated.

Certain terminologies, such as “coupled,” “fixed,” “attached to,” “communicatively coupled to,” and “operatively coupled to,” warrant elucidation. They encapsulate both direct and intermediary connections, potentially involving secondary components. “Communicatively” and “operatively” couplings can signify affiliations that are either physical or electrical in nature.

The operational architecture of the disclosure relies heavily on computer-executable instructions corresponding to flowcharts and block diagrams, encapsulating methods and apparatuses. These instructions, designed for various processors in computers or comparable devices, instantiate the conceptualized mechanisms into functional entities.

These computer program instructions have the potential to be archived on computer-readable mediums. This facilitates the manifestation of specific operational behaviors in computational devices, bridging the gap between abstract diagrams and tangible, machine-operated processes.

The adaptability of these computational instructions is noteworthy. Whether autonomously executed or combined with human interventions, they exemplify the synergy between automated and manual actions, holistically bringing the disclosure to fruition.

The illustrative nature of the articulated embodiments is pivotal. While offering a structured approach, the disclosure remains amenable to myriad modifications and expansions. This flexibility ensures that its essence can be actualized in diverse modalities, all the while preserving its core principles.

Disclosed herein are systems and methods for displaying the benefits associated with financial cards, such as credit and debit cards, either through use of a removable indicator (e.g., a sticker), embedded within the design depicted on the physical card, and/or using a digital representation of a physical card that is usable with a digital wallet. In some embodiments, benefits are incorporated into the design of these cards and can also be presented on a removable sticker, which can be updated or replaced as the card benefits change. This allows customers the flexibility to customize which benefits are displayed on their virtual cards and which are printed on their physical cards. Such enhancements significantly improve the visibility of benefits on these cards, potentially encouraging greater usage. Unlike existing methods, where benefits are typically communicated through indirect channels such as online banking interfaces, emails, or physical mailings, often leading to low visibility at the point of sale, embodiments of the invention provide stickers that list reward benefits for placement on credit and debit cards and integrates the display of rewards directly into the card design for both physical and virtual cards.

One embodiment of the present invention introduces a novel system and method for displaying the benefits associated with financial cards, such as credit and debit cards, directly on the card itself. The system involves the integration of a benefits display (see indicator 20 on FIGS. 13-15) onto a physical card (see card 10 on FIGS. 13 and 15), and/or a virtual card (such as a virtual depiction of the card 40 on FIG. 14). The benefits display (see indicator 20 on FIGS. 13-15) shows the list of benefits associated with the card in a clear and easily accessible manner. Example benefits that may be displayed can include, but are not limited to, cash back, rewards points, discounts, or travel perks. The benefits display (see indicator 20 on FIGS. 13-15) may also present personalized messages or reminders to the cardholder about the benefits that they can utilize, based on their past spending habits or upcoming benefits expiry dates. This innovative approach aims to improve the cardholder's experience by aiding them in understanding, remembering, and utilizing their card benefits to the fullest extent.

Overview of System and Environment (100)

FIG. 1 illustrates a schematic representation of an enterprise system (300) and its environment (100), in accordance with an embodiment of the present invention. This illustration showcases the complex connections and interactions between the mobile device (200) of a user (12), computer (198), and the overarching enterprise system (300), elucidating how a user (12) can derive benefits from the system's (300) services and products. The system (100) facilitates user (12) interactions with digital banking through both a computer (198) and a mobile device (200). This system ensures seamless operation and efficient data transactions across components. The mobile device (200) and the computer (198) are connected to the network (330), enabling data exchange with the enterprise system (300).

Components of Mobile Device (200)

Central to the mobile device (200) is the processing unit (204). Examples of such processors in mobile devices include Qualcomm's Snapdragon series or Apple's A-series chipsets. The processing unit (204) handles the execution of instructions (210) and facilitates the operations of various applications and programs (214), including banking applications (216).

The memory device (206) in the mobile device (200) consists of volatile components such as RAM and non-volatile components like ROM. This memory device (206) temporarily stores data and instructions (210) required for the execution of applications (214).

The storage device (208) within the mobile device (200) incorporates long-term storage mediums such as solid-state drives and flash drives. This storage device (208) retains user data, application data, and other necessary information (236). Instructions (210) within the mobile device (200) are crucial sets of software codes that dictate its operations. These instructions (210) guide the processing unit (204) in executing tasks and running applications (214). The battery or power source (212), such as lithium-ion or lithium-polymer cells, powers the mobile device (200). This ensures uninterrupted operation of the device and its components.

Within the mobile device (200), various applications and programs (214) cater to diverse user needs. An example is the program (216), a banking application that allows users to perform financial transactions, manage accounts, and access card benefits.

The input-output system (218) in the mobile device (200) facilitates interactions via touchscreens, buttons, and other interfaces. Thissystem (218) enables the user (12) to interact with applications (214) and execute commands.

Data flow in the mobile device (200) is managed by the intraconnect (220), such as a high-speed system bus. This intraconnect (220) ensures efficient communication between the processing unit (204), memory device (206), and storage device (208).

Visual output for the mobile device (200) is presented on the mobile display (222) using technologies such as OLED. The display (222) shows the user interface, application screens, and other visual data.

The mobile device (200)'s auditory functions are handled by a microphone (224) and a speaker (226). These components facilitate audio input and output for applications (214) requiring sound interaction.

For imaging and security functions, the mobile device (200) incorporates the camera (228). The camera (228) can be used for scanning QR codes, capturing images, and enabling video calls.

The communication interface (230) in the mobile device (200) connects to external networks. Data transmission is handled by the wireless communication device (232), such as Wi-Fi 6, and the wired communication device (234), for example, USB-C. This interface (230) ensures that the mobile device (200) can exchange data with the network (330) and other connected systems such as routers, modems, and other IoT devices.

The GPS (202) in the mobile device (200) provides location services, facilitating features such as location-based security and banking services. The GPS (202) helps in tracking the device's location and enhancing user experience through location-specific services.

Other data (236) such as cached data, pictures, and user preferences are stored within the mobile device (200), contributing to personalized user experiences and data richness. This data (236) is managed by the storage device (208) and is used by various applications (214).

Components of Enterprise System (300)

The processing device (310) in the computing system (302) handles computational tasks using high-performance chipsets such as Intel Xeon or AMD EPYC processors. The processing device (310) executes instructions (316) and manages data processing within the enterprise system (300).

Data access within the computing system (302) is managed by the memory device (312), which includes RAM and ROM, and the storage device (314), which can be HDDs or SSDs. These components store and retrieve data required for system operations and applications (318).

Guiding the operations within the computing system (302) are the instructions (316). These software codes direct the processing device (310) in executing tasks and managing data flow.

The computing system (302) runs various applications and programs under segment (318), including a specialized program (320) for managing card benefits. These applications (318) facilitate the management of card benefits and other financial services within the enterprise system (300).

Internal communication within the computing system (302) is overseen by the intraconnect (322). This ensures efficient data transfer between the processing device (310), memory device (312), and storage device (314).

For external connections, the computing system (302) employs the communication interface (324). Data transfers are facilitated by the wireless communication device (326) and the wired device (328), such as Gigabit Ethernet ports. This interface (324) enables the computing system (302) to communicate with the network (330) and other connected devices such as external storage systems, cloud servers, and backup systems. External connections are crucial for accessing cloud services, external databases, and ensuring redundancy and data recovery.

Network (330) and Interactions

The computer (198) and the external systems (192, 194, and 196) connect to the network (330), ensuring a fluid user experience across internal and external components. Examples of external systems include payment gateways, third-party financial services, and regulatory compliance systems. The network (330) facilitates data exchange between the mobile device (200), computing system (302), and external systems (192, 194, 196), supporting the seamless operation of digital banking and card benefit management.

Human agents (304) interface through the human agent device (306), which can range from advanced workstations to interactive terminals. These agents (304) interact with the enterprise system (300) to manage data, support users, and ensure efficient system operations. Collaboration with the virtual agent (308) in the enterprise system (300) aids in efficient data analysis and interactions. The virtual agent (308) processes data, supports decision-making, and enhances user interactions within the system.

Figure 2:
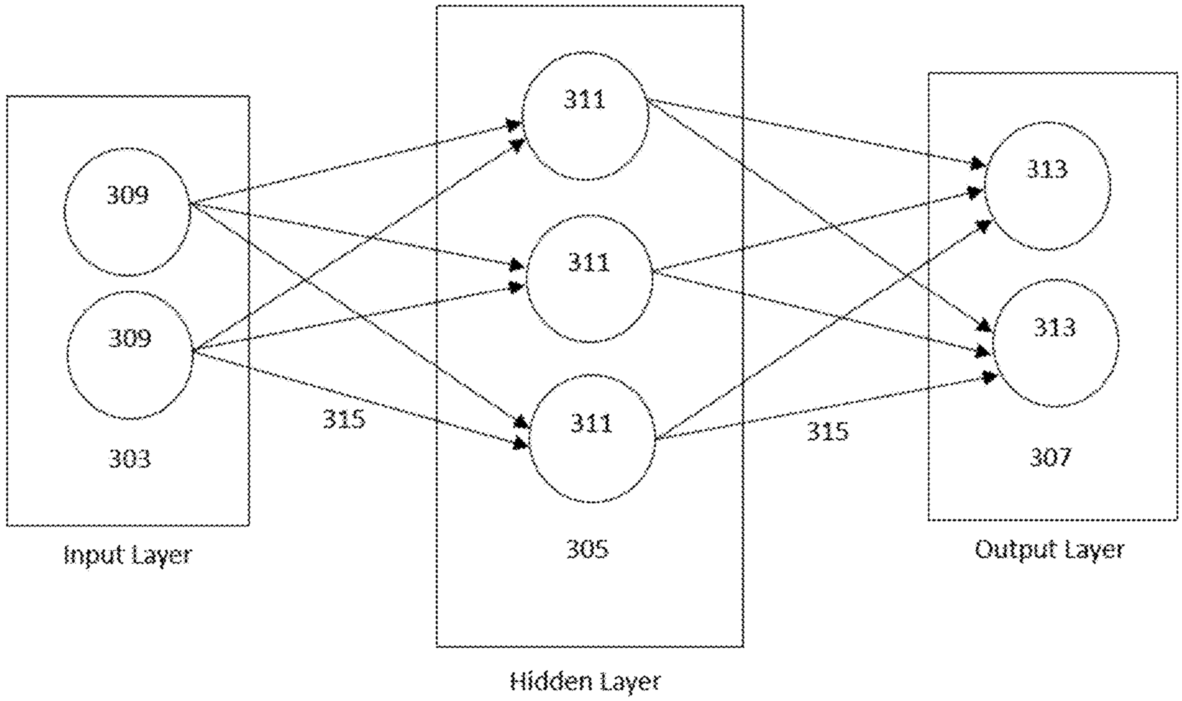
FIG. 2 is a diagram of a feedforward network, in accordance with an embodiment of the present invention.

FIG. 2 is a diagram of a feedforward network (301), in accordance with an embodiment of the present invention. The feedforward neural network (301) serves as a foundational structure for understanding and modeling complex patterns and relations within a given dataset. Unlike recurrent neural networks, the flow of information in a feedforward neural network (301) is unidirectional, ensuring that data moves from the input towards the output without any loopback.

Components of the Feedforward Neural Network (301)

Input Layer (303): At the beginning of the feedforward neural network (301) lies the input layer (303). It is responsible for receiving and processing input data. Within this layer, there are multiple nodes (309). These nodes (309) represent individual data features or attributes. For example, in the context of displaying card benefits, the input nodes (309) could represent features such as card usage frequency, types of transactions (e.g., groceries, travel), and user preferences. Other examples include pixel values for image recognition or transaction details in a financial dataset. The number of nodes (309) typically corresponds to the number of input features in the dataset.

Hidden Layer (305): Following the input layer (303), the network comprises one or more hidden layers (305), with the hidden layer (305) being a primary example. Within the hidden layer (305), there exist multiple nodes (311). These nodes (311) are responsible for transforming the input data through a series of weights and activation functions. In the context of card benefits, the hidden layers (305) could analyze patterns such as identifying which benefits are most relevant to the user based on past usage or predicting future benefit utilization. For instance, it might detect that a user frequently uses travel-related benefits and thus prioritize displaying travel perks. Other examples include identifying edges and textures in image recognition or detecting spending habits in financial data. The transformed data is then propagated forward to the next layer. The purpose of the hidden layer (305) is to introduce non-linearity to the network, enabling it to capture and model complex relations in the dataset.

Output Layer (307): The terminal point of the feedforward neural network (301) is the output layer (307). It consists of multiple nodes (313) that generate the final predictions or classifications based on the transformed data from the preceding layers. In the context of card benefits, the output layer (307) might present the most relevant benefits to the user, such as suggesting the top three benefits that align with the user's spending patterns. Depending on the problem at hand, the output layer (307) can represent a single value (for regression tasks like predicting the most likely benefit to be used next) or multiple values (for classification tasks like categorizing user transactions).

Node Interactions: Each node in the input layer (303) interacts with every node (311) in the hidden layer (305). This interaction involves a weighted connection (315), where the data from the input node (309) is multiplied by a weight before it is passed on to the node (311) in the hidden layer (305). Similarly, every node (311) in the hidden layer (305) interacts with every node (313) in the output layer (307), again via weighted connections (315). For example, input data such as transaction type and frequency may be weighted and combined to determine the significance of various benefits in the hidden layers (305). These weighted combinations continue through the network layers, refining the predictions. It's imperative to note that while nodes between layers interact with one another, nodes within the same layer (be it input, hidden, or output) do not have any interactions amongst themselves.

Figure 3:
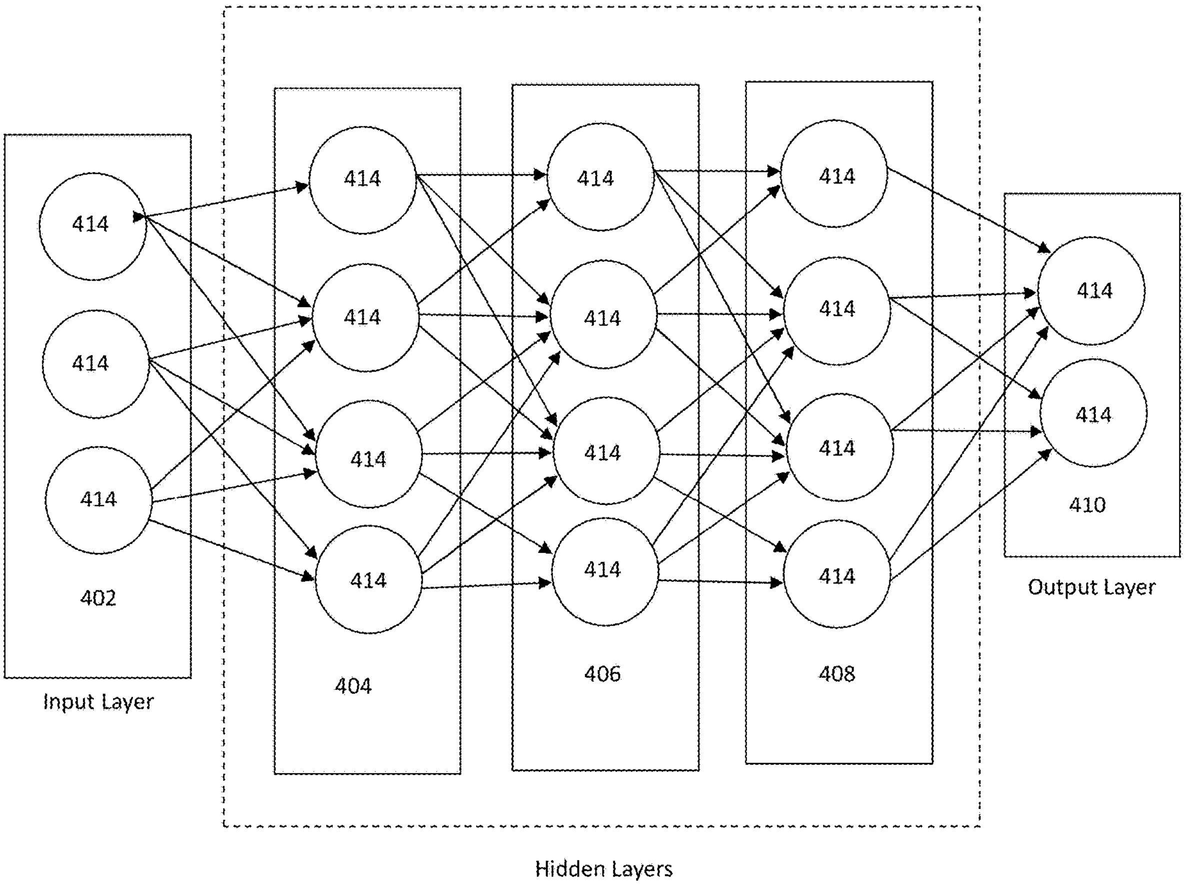
FIG. 3 depicts a visualization of a convolutional neural network (CNN), in accordance with an embodiment of the present invention.

Overall, the feedforward neural network (301) offers a robust architecture to model complex datasets by ensuring a streamlined and directed flow of information through its layers, from input to output. This structured approach allows the network to learn and generalize from data effectively, making it suitable for various tasks, including personalized display of card benefits, image recognition, financial forecasting, and natural language processing FIG. 3 depicts a visualization of a convolutional neural network (CNN) 400, in accordance with an embodiment of the present invention. The CNN (400) is a specialized neural network type tailored for processing and analyzing structured data. This includes applications such as image processing, exemplified by QR code scanning, and extends to domains like transaction pattern analysis where spatial relationships within the data are critical.

Input Layer 402: The starting point of the CNN (400) is the input layer (402). It consists of multiple nodes (414), each dedicated to processing input data. In the context of QR code scanning, these nodes (414) represent the pixel values of the captured image. For transaction data, these nodes (414) could process elements structured in a grid-like format, such as time-based spending habits or categorically organized transaction types, which can be visually and spatially analyzed.

Hidden Layers (404, 406, and 408): The CNN (400) includes three hidden layers (identified as 404, 406, and 408). These layers contain nodes (414) that capture and analyze features from the input data. For example, the first hidden layer (404) might detect basic spending patterns, while deeper layers (406 and 408) interpret more complex relationships, such as the correlation between spending categories and card benefits usage. This hierarchical processing is akin to how layers in image processing tasks detect and interpret features from simple to complex.

Output Layer (410): The culmination of the CNN (400) is the output layer (410), comprising multiple nodes (414). In QR code scanning, this layer outputs decoded information. In the context of analyzing card benefits, it could predict which benefits are most likely to appeal to the user based on their transaction patterns, offering outputs such as recommended benefits or personalized offers.

Node Interactions: Each node in the input layer (402) interacts with every node in the first hidden layer (404) via convolutional operations, which are particularly effective at capturing spatial and temporal dependencies in the data. This process is repeated through each layer until reaching the output layer (410), allowing the CNN to build a comprehensive understanding of the input data, whether it's pixel data from images or structured transaction data.

Overall, the CNN (400) excels at processing structured data, whether it's derived from visual inputs like images or from spatially and temporally organized transaction data. This capability makes it highly effective for tasks that require nuanced understanding of complex data relationships, such as recommending card benefits based on user behavior.

Figure 4:
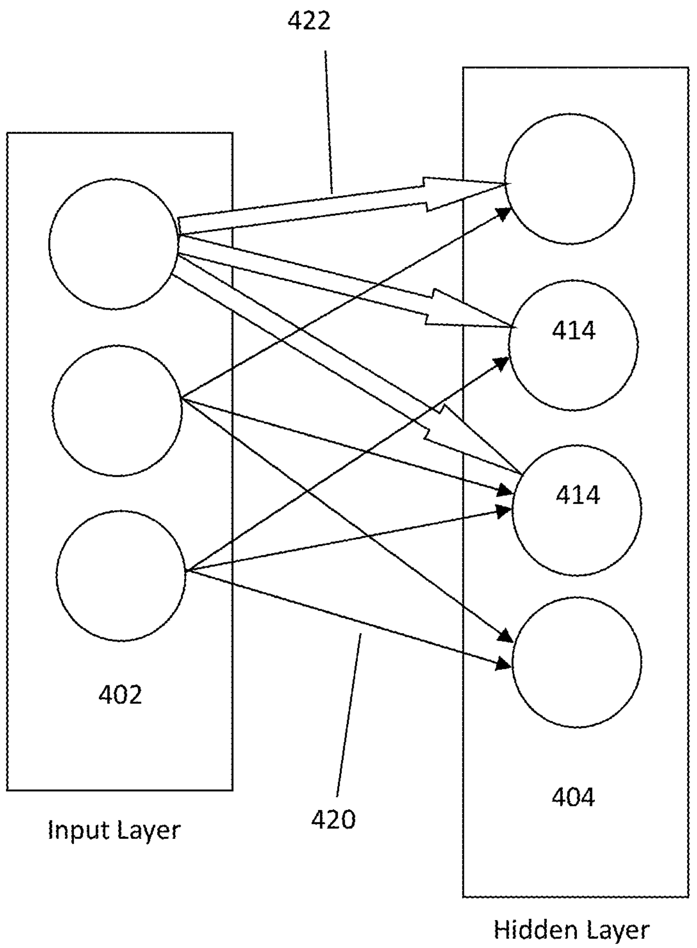
FIG. 4 depicts a detailed insight into a segment of the CNN illustrated in FIG. 3, in accordance with an embodiment of the present invention.

FIG. 4 depicts a detailed insight into a segment of the CNN (400) illustrated in FIG. 3, in accordance with an embodiment of the present invention. In particular, FIG. 4 depicts the specific interactions between the input layer (402) and the first hidden layer (404). This depiction emphasizes how convolutional layers process and filter inputs to extract relevant features, whether for decoding QR codes or analyzing transaction patterns Hidden Layer (404) Nodes: The first hidden layer (404) includes multiple nodes, each capable of processing different aspects of the input data. In the case of QR code scanning, these nodes might focus on specific patterns within the code. For transaction data, these nodes might identify patterns that are predictive of user preferences for certain card benefits.

Weight Assignments: Weights in the CNN (400), such as those represented by identifiers (420) and (422), modulate the influence of each input node on the corresponding hidden nodes. These weights are adjusted during training to optimize the network's ability to accurately predict outcomes based on the learned data features.

Interactions between Input and Hidden Nodes: Connections between nodes in the input layer (402) and the hidden layer (404) dictate how information is processed and passed forward. These interactions are key to the CNN's (400) ability to adapt and learn from both visual data like QR codes and structured datasets like transaction records.

Importance of Weight Assignments: The adaptability and learning capabilities of the CNN (400) hinge on the proper adjustment of weights, allowing the network to emphasize or de-emphasize specific inputs to achieve accurate predictions across various applications, including personalized card benefit recommendations. Overall, the intricate mechanisms of node interactions within CNN (400), underscore how convolutional layers process inputs through a series of weighted connections. These connections are essential for the network's ability to discern and learn from both structured and unstructured data. By fine-tuning these weights through training, the CNN can effectively adapt to diverse data types, from visual information like QR codes to complex patterns in transaction data, enhancing its ability to make accurate predictions and offer personalized recommendations based on user behavior.

Figure 5:
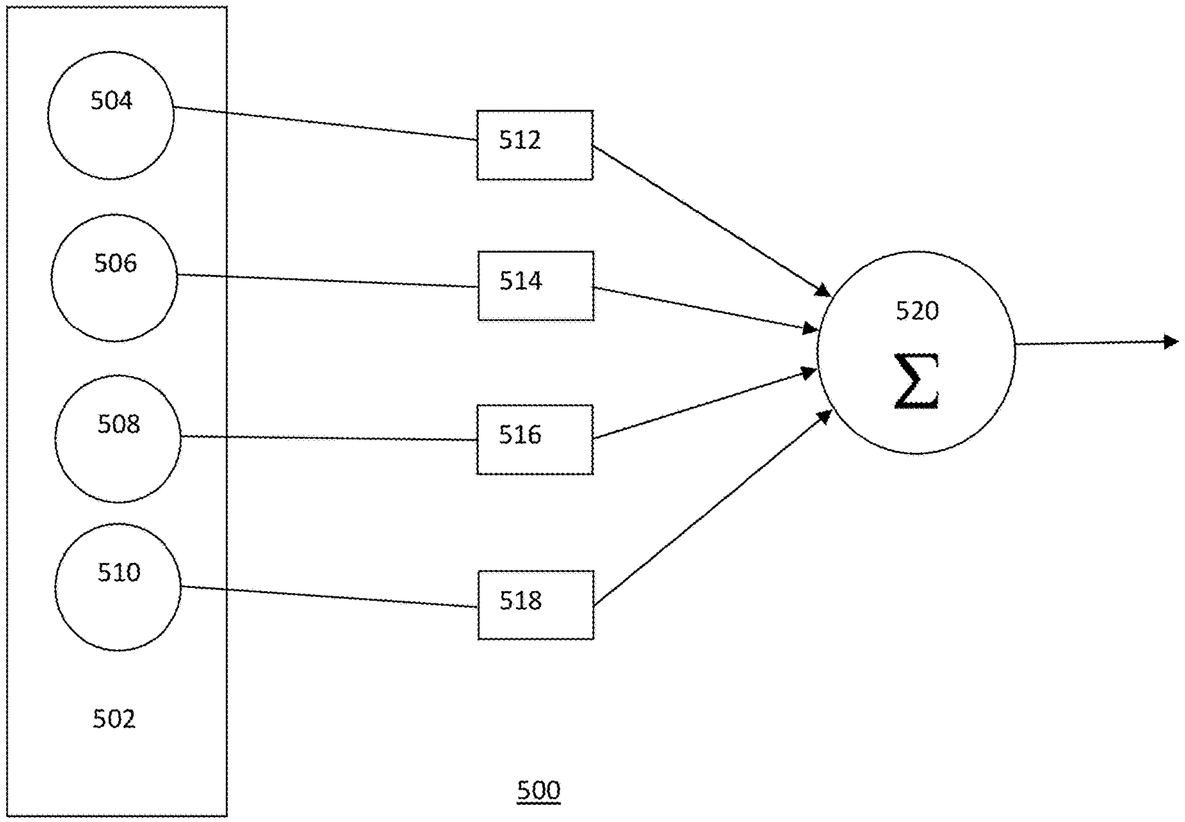
FIG. 5 depicts a diagrammatic representation of the weighted sum computation in a node of a CNN, in accordance with an embodiment of the present invention.

FIG. 5 depicts a diagrammatic representation of the weighted sum computation in a node of a CNN (500), in accordance with an embodiment of the present invention. In particular, FIG. 5 focuses on detailing the mechanism of weighted sum computation in a specific node of the CNN (500). This computational detail is paramount to understanding the underlying processes that enable the CNN (500) to perform sophisticated data transformations, pivotal in tasks like feature recognition. This process is especially critical in analyzing transaction patterns and card usage data to dynamically update and personalize card benefits displayed to the user.

CNN (500) offers a snapshot of an architecture where the spotlight is on the node (520) residing in a hidden layer. This representation serves to exemplify how individual nodes in the CNN (500) process incoming data from previous layers. In the context of the patent, such nodes could be analyzing transaction data to detect spending patterns relevant to card benefits.

Input Layer (502) and Respective Nodes: Input layer (502) houses several nodes (504, 506, 508, and 510) that serve as data feeders for the succeeding layers. Each node (504, 506, 508, and 510) has certain values representing features or patterns from the raw input data. In a card benefits system, these might include data points like transaction amount, merchant category, time of transaction, and user-selected preferences. It's these values that eventually get passed onto the nodes in subsequent layers.

Assigned Weights for Inputs: Each connection from the input nodes (504, 506, 508, and 510) to node (520) in the hidden layer has an associated weight. These weights (512, 514, 516, and 518) modulate the input values. In essence, these weights determine the significance or influence each input has on the node (520). During the network's training phase, these weights (512, 514, 516, and 518) undergo adjustments, ensuring that the network hones its capability to make accurate predictions or classifications. For example, weights (512, 514, 516, and 518) might be adjusted to prioritize users' preferred transaction types when predicting which card benefits to highlight.

Weighted Sum Computation at Node (520): The primary operation at node (520) is the computation of a weighted sum. This computation involves multiplying each input value from nodes (504, 506, 508, and 510) by their respective weights (512, 514, 516, and 518). The results of these multiplications are then aggregated to produce a single value. This value is the weighted sum, which acts as the node (520)'s processed input. Post this computation, the value typically undergoes an activation function, transforming it before it's passed onto nodes in subsequent layers. This step is crucial for assessing how different aspects of a user's spending behavior influence the selection of relevant card benefits.

Figure 6:
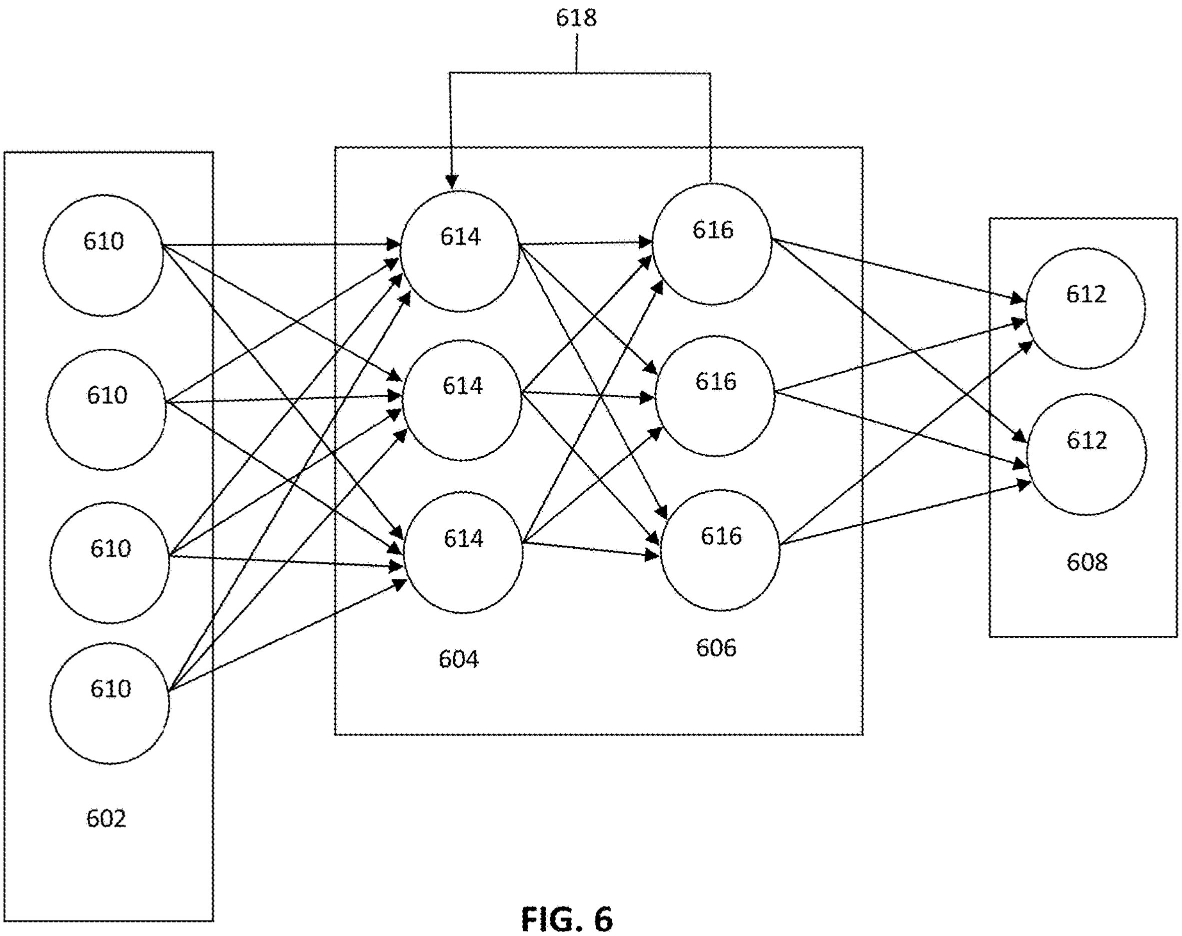
FIG. 6 depicts a recurrent neural network (RNN) utilized in machine learning, in accordance with an embodiment of the present invention.

Overall, FIG. 5 offers an insightful view into the nuanced computations occurring at a single node in a CNN (500). By detailing the weighted sum process and emphasizing the role of input weights, this representation elucidates the foundational arithmetic that drives CNNs, underscoring the network's ability to transform raw data into meaningful, processed information. This capability is integral to the personalized display of card benefits, ensuring that users receive the most relevant offers based on their individual transaction profiles FIG. 6 depicts a recurrent neural network (RNN) (600) utilized in machine learning, in accordance with an embodiment of the present invention. The RNN (600) is notable for its ability to incorporate past information into current computations, distinguishing them from traditional feedforward neural networks. This characteristic is particularly valuable for tasks involving sequential data or time series information, which could be applied to optimize card benefit offerings.

Structure of RNN (600): The RNN (600) includes an input layer (602), an output layer (608), and two hidden layers (604 and 606). The input layer (602) features nodes (610) that accept and transmit raw or pre-processed data into the RNN (600). For instance, these nodes (610) might handle sequences of transactions, identifying spending trends or frequent transaction categories that inform card benefit predictions. The output layer (608) contains nodes (612), responsible for presenting the final processed data or predictions, such as recommending card benefits tailored to user spending behaviors identified by the network.

Feedback Connector (618) and its Significance: One of the distinguishing features of RNN (600) is the feedback connector (618), which relays parameter data from the nodes (616) in the second hidden layer (606) back to the nodes (614) in the first hidden layer (604). The feedback mechanism provided by the feedback connector (618) enables the network's (600) recurrent nature, allowing past computations to dynamically influence current operations, enhancing the accuracy and relevance of benefit suggestions based on ongoing user activities.

Parameter Communication Across Layers: RNN (600) demonstrates flexibility in communicating parameters or other data between layers. For example, nodes from a subsequent layer might relay updated spending habit data back to earlier layers, refining the network's predictions over time. This functionality ensures that changes in user behavior are quickly incorporated into the benefit analysis, maintaining up-to-date recommendations.

Potential for Multiple Feedback Connectors: While FIG. 6 illustrates the use of feedback connector (618), RNN (600) can also include multiple feedback connectors. These additional connectors might link various node systems, enhancing the network's ability to handle complex, multi-dimensional data flows. For example, in a card benefits system, multiple feedback connectors could help track and analyze several user behaviors simultaneously, such as changes in spending patterns, location-based transactions, and frequency of benefit usage.

Overall, FIG. 6 highlights the specialized architecture of RNN (600), showcasing its recurrent capabilities through feedback connectors. This design equips the RNN (600) to handle sequential data effectively and is used for shaping current and future benefit offerings based on comprehensive analysis of past and present user data.

Figure 7:
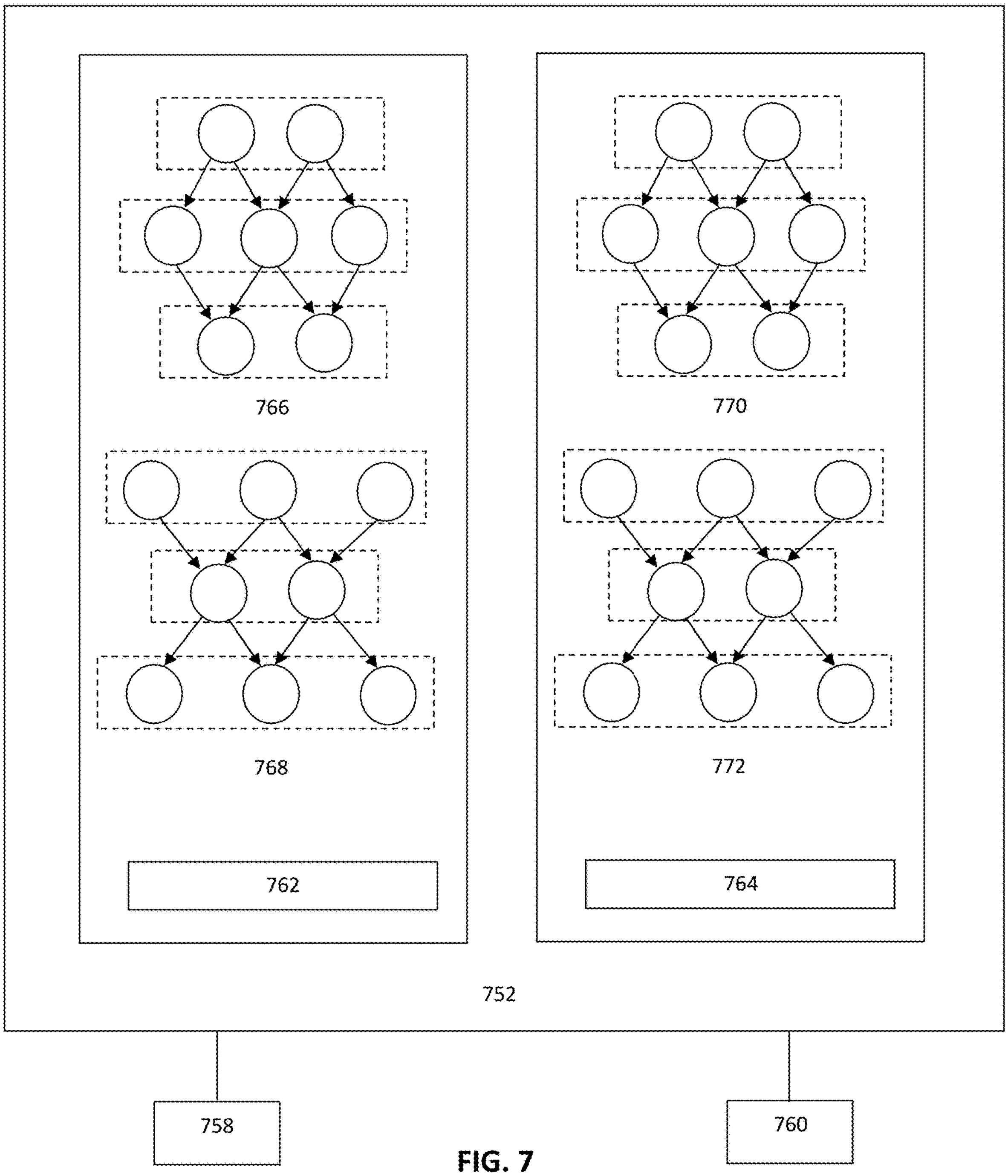
FIG. 7 depicts a schematic representation of artificial intelligence processing within an artificial intelligence program, in accordance with an embodiment of the present invention.

FIG. 7 depicts a schematic representation of artificial intelligence processing within an artificial intelligence program, in accordance with an embodiment of the present invention. Deep Neural Networks (DNNs) represent a subset of neural network architectures that comprise multiple layers, typically more than three, between the input and the output layers. This multi-layered configuration enables DNNs to model and process high-level abstractions of data, rendering them highly effective in various complex machine learning tasks. While tasks such as image recognition, speech recognition, and language translation have seen significant advancements, DNNs are equally potent in financial services for analyzing complex transaction patterns and customizing card benefits based on user behavior. FIG. 7 depicts a detailed schematic of an artificial intelligence programming system, labeled as system (750). At the heart of this system lies the AI processor (752), a dedicated processing device specifically tailored to operate artificial intelligence programs efficiently. Within the AI processor (752), there are distinct operational divisions, prominently the front-end sub-processor (754) and the back-end sub-processor (756). These sub-processors play crucial roles in the overall functioning of the AI system. The front-end sub-processor (754) is primarily vested with tasks like data pre-processing and feature extraction. In the context of card benefits, this might involve analyzing transaction data to identify spending habits, categories, and user preferences that form the foundational features for subsequent processing stages. The back-end sub-processor (756), on the other hand, delves deeper into the data, leveraging the features identified by the front-end sub-processor to make predictions about the most suitable card benefits or to classify transaction types for better user engagement and satisfaction. Accompanying the AI processor (752) is memory device (758), which serves as a reservoir for algorithms and computational instructions associated with both sub-processors. Moreover, system (750) is further equipped with an additional memory component, labeled as memory (760). This memory houses vital instructions essential for the smooth operation of the AI program, ensuring that the AI processor has a consistent reference for its tasks. Delving into the intricate details of the sub-processors, the front-end sub-processor (754) incorporates neural networks (766 and 768). These networks operate an AI algorithm (762), exemplified by feature recognition. Feature recognition, in essence, discerns discernible patterns or attributes within raw data that are paramount for subsequent data processing stages, such as identifying spending trends that influence card benefits optimization. In tandem, the back-end sub-processor (756) boasts of neural networks (770 and 772). These networks are instrumental in running an AI algorithm (764), which is primed to execute specific operations on the dataset relayed to it. Operations here could include data classification, regression analysis, or prediction tasks tailored to enhance the personalization of card benefits, ensuring that recommendations are both timely and contextually relevant.

Overall, FIG. 7 meticulously details the structure and operational dynamics of system (750), underscoring the pivotal roles of the AI processor, its sub-processors, and the neural networks within. This intricate system showcases the synergy between hardware and algorithms, enabling advanced AI operations and exemplifying the progressive strides in artificial intelligence and machine learning realms, particularly in the enhancement of financial services and personalized card offerings.

Figure 8:
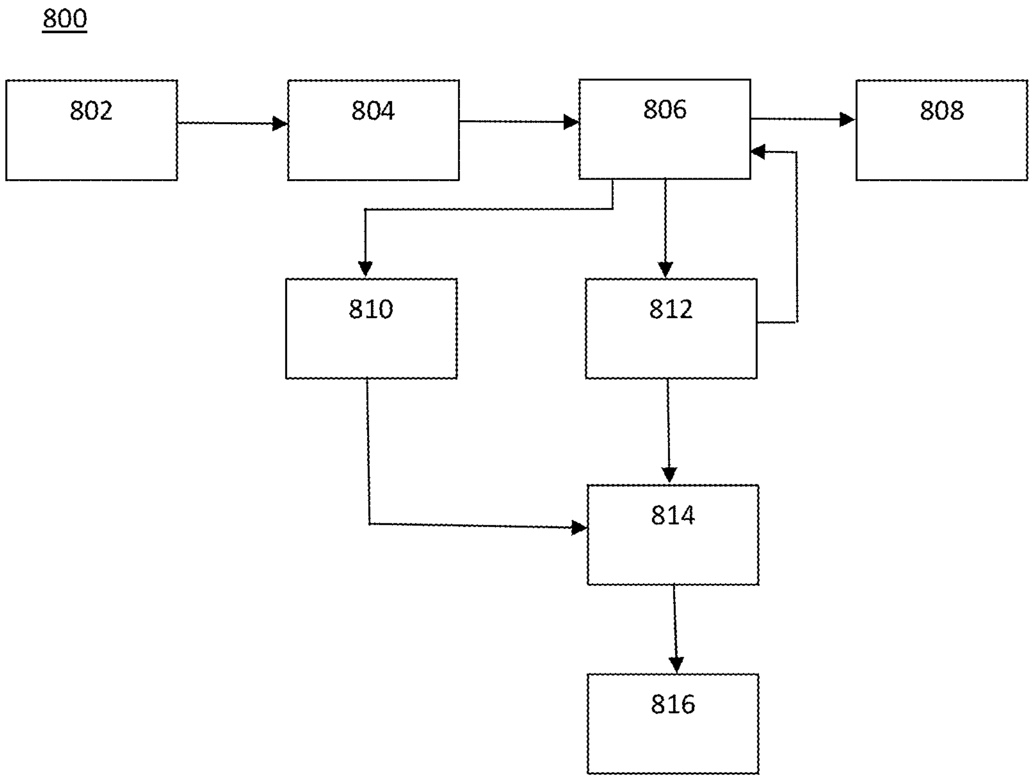
FIG. 8 depicts a flow chart depicting a method for training a machine learning model, in accordance with an embodiment of the present invention.

FIG. 8 depicts a flow chart depicting a method (800) for training a machine learning model, in accordance with an embodiment of the present invention. The diagram of the method (800) provides a comprehensive delineation of a methodological process encompassing the development and subsequent deployment of models within the vast domain of machine learning. Methodically charting out the integral sequences, FIG. 8 serves as an archetype for successful orchestration and realization of myriad machine learning projects, particularly in enhancing card benefit systems and customer engagement strategies.

User Initiation—Box (802): Box (802) stands as the initial touchpoint where a user—be it a financial analyst, a customer service AI, or a decision-support system—actively orchestrates, triggers, or sets into motion the machine learning procedure. For example, in the context of card benefits, this might involve initiating a new project to analyze spending patterns to tailor card offers.

Data Assimilation—Box (804): Transitioning to Box (804), this juncture serves as the epicenter for comprehensive data acquisition. In the context of a financial institution, data could range from transaction histories, customer demographic information, and past card benefit utilization, all collated and prepared for analysis.

Preprocessing of Data—Box (806): Box (806) delves into preprocessing, where the acquired data is streamlined and conditioned, making it suitable for detailed analysis. In the card benefits context, this might involve cleaning transaction data, categorizing expenditures, and encoding categorical variables for further machine learning processes.

Detection of Anomalies—Box (808): The journey proceeds to Box (808), which focuses on anomaly detection. In a card management system, this could involve identifying unusual spending patterns that may indicate fraud or misuse of card benefits, thereby triggering alerts to both customers and system managers.

Loop Initiation for Training and Testing—Box (810): Box (810) introduces the iterative process of training and testing, where historical data on customer transactions and benefit claims forms the foundation for developing predictive models aimed at optimizing benefit offerings.

Training of the Model—Box (812): Box (812) details the training of the model, where features like spending habits, frequency of transactions, and customer feedback on card benefits are used to refine predictive algorithms, enhancing their accuracy in personalizing offers.

Testing of the Model—Box (814): Next, Box (814) outlines the rigorous testing phase, where the trained model is evaluated against unseen data or recent transaction data to ensure its effectiveness in predicting card benefit preferences accurately.

Deployment of the Model—Box (816): Culminating the narrative, Box (816) heralds the deployment phase. Here, the validated models are integrated into the card management systems, actively used to automate and personalize card offers based on predictive insights derived from customer data.

Overall, embodied within FIG. 8 is a meticulously detailed, structured walkthrough of a machine learning model's lifecycle. This lifecycle is crucial for managing card benefits, from initial data gathering and model training to final deployment, ensuring that cardholders receive offers that are both timely and relevant to their spending behaviors.

Introduction to Digital Wallets: Before diving into the technical exposition of FIG. 9, it is important to provide an overview of a digital wallet. A digital wallet, often colloquially termed as an 'e-wallet', serves as an electronic device or online service that allows an individual to make electronic transactions. This digital platform can be linked to an individual's bank account, debit cards, credit cards, or even prepaid cards, facilitating a seamless bridge between the virtual and physical financial realms. Beyond financial transactions, digital wallets can securely store personal details and digital assets like tickets or boarding passes.

Figure 9:
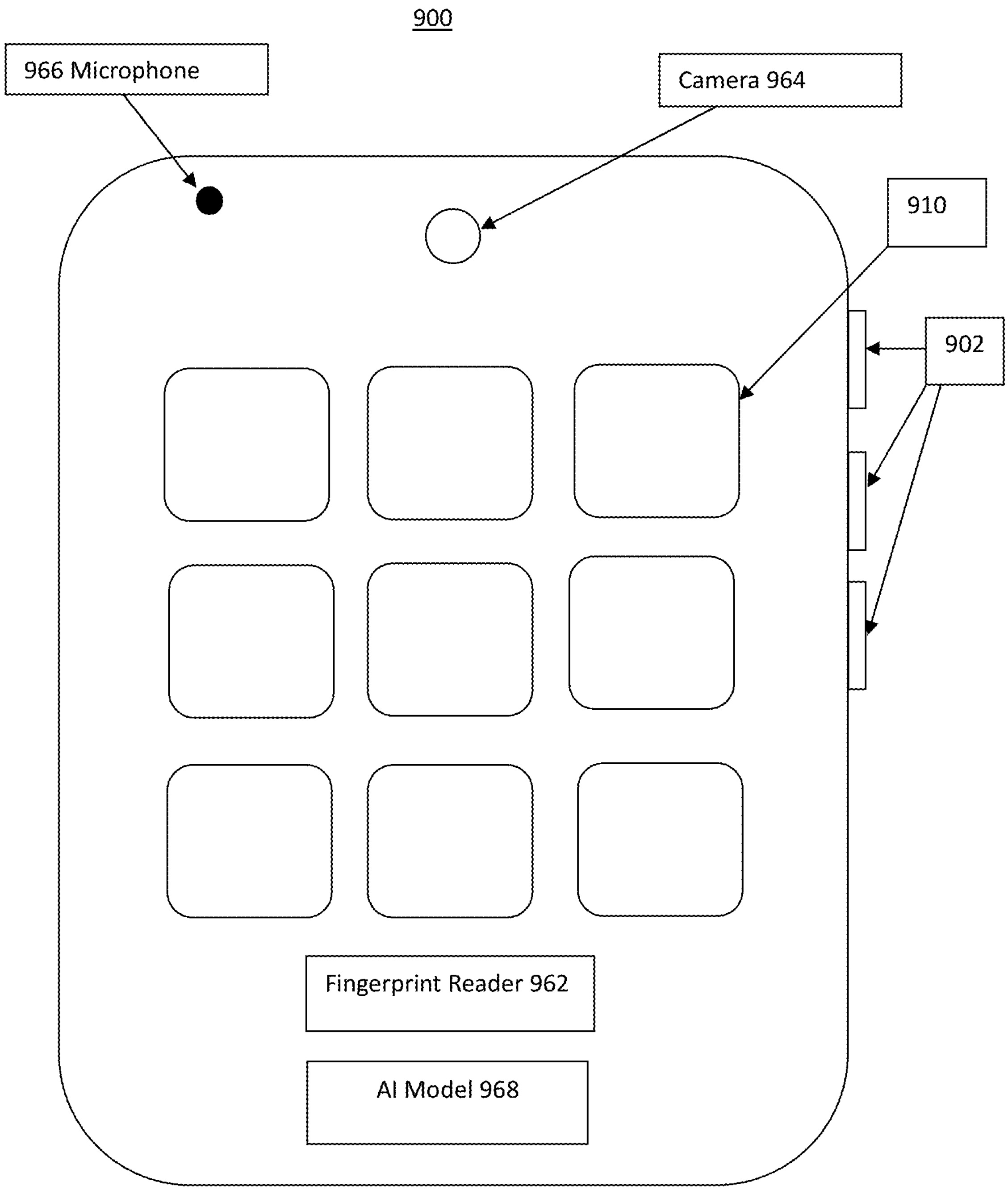
FIG. 9 depicts a front view of an example mobile device that includes a user interface, in accordance with an embodiment of the present invention.

FIG. 9 depicts a front view of an example mobile device (900) that includes a user interface, in accordance with an embodiment of the present invention. FIG. 9 paints a vivid portrait of the front view of mobile device (900), a contemporary smartphone archetype. Equipped with multiple side buttons (902), mobile device (900) enables versatile interactions, including dedicated access to the digital wallet, customizable through settings for increased personalization and security.

Side Button—Component (902): The side button (902), a multifunctional facet of mobile device (900), may serve various roles from device locking to serving as a secure access point for the digital wallet. Programmable for security checks, it can activate biometric verifications like fingerprint scans, complemented by the potential for facial and voice recognition for enhanced security and ease of access. In addition, the side button (902) provides users with consistent access to the device's functionalities.

Multi-Factor Authentication Protocols: Integral to the device's security framework are advanced authentication protocols, which may include but are not limited to, biometric verification through a fingerprint reader (962), facial recognition via the integrated camera (964), and voice commands through the microphone (966), potentially interfacing with third-party applications akin to PayPal Wallet. With the increasing ubiquity of digital payments and the shift towards a cashless society, these wallets are becoming an indispensable tool for the modern consumer, safeguarded by robust multi-factor authentication that includes biometrics, personal identification numbers, and sophisticated AI models (968) for voice and facial recognition. A touch button (910) allows users to manually enter or verify information, such as security codes, not captured initially.

Near Field Communication (NFC) Capability and Online Purchase Function: The digital wallet's versatility extends to both physical and online domains, utilizing NFC for contactless in-store purchases and enabling straightforward online transactions. Such capabilities ensure that the digital wallet serves as a comprehensive tool for financial management and transactions.

Figure 10:
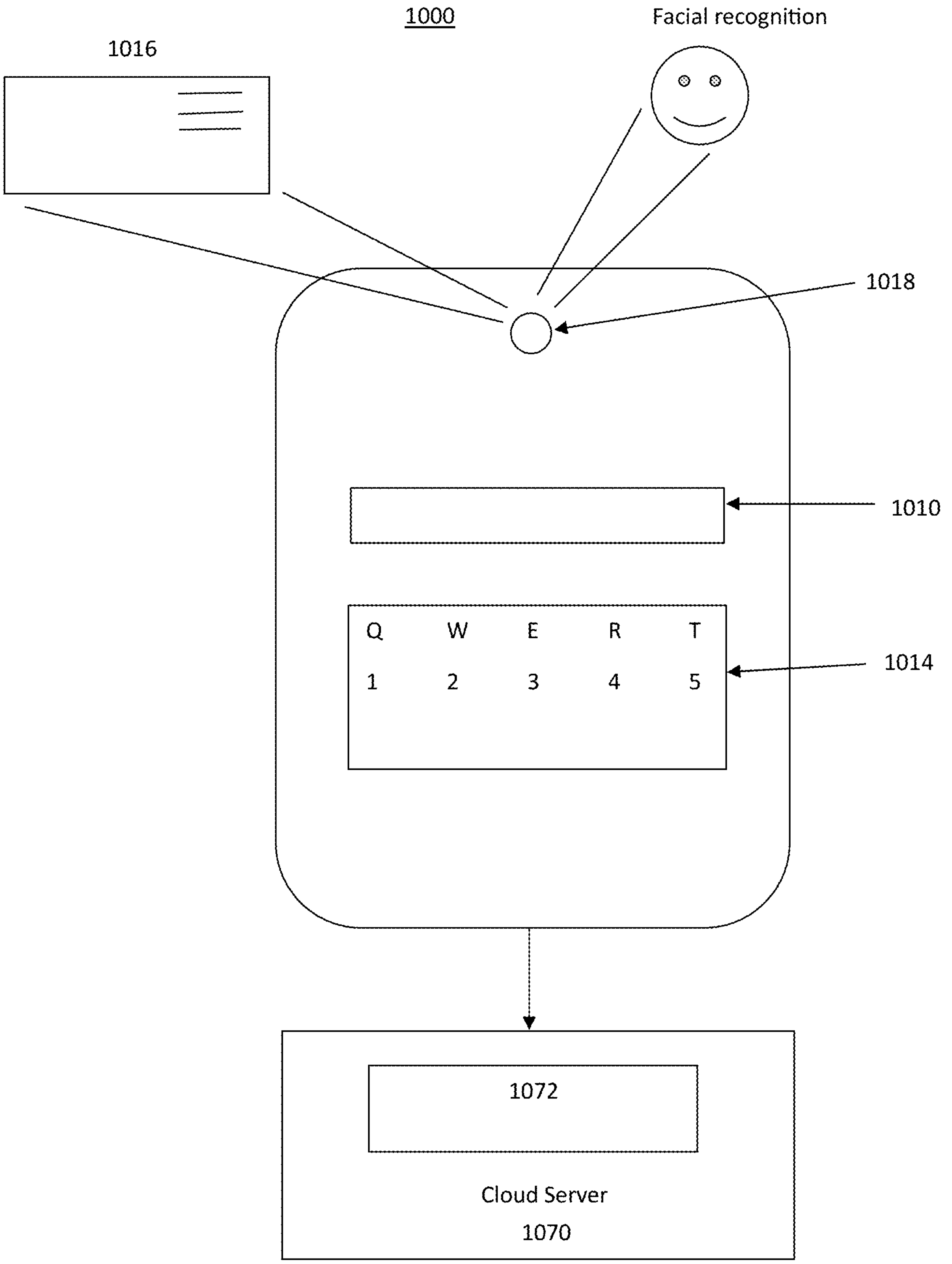
FIG. 10 depicts a front view of an example mobile device that includes a camera for scanning a card, in accordance with an embodiment of the present invention.

FIG. 10 depicts a front view of an example mobile device (1000) that includes a camera (1018) for scanning a card (1016), in accordance with an embodiment of the present invention. Digital Wallet Setup Process: Central to FIG. 10, the digital wallet setup process is optimized through the camera (1018), which functions dually as a card scanner, capturing card details from the card (1016) for easy addition to the digital wallet, and as a means for facial recognition during the security verification process. The camera's (1018) dual-purpose nature streamlines user interaction and system complexity. Additionally, users can add cards (1016) by manually entering the card details, which includes inputting the card number, expiration date, and card verification value (CVV) code. Another method involves integrating the digital wallet with the user's bank or financial institution app, which can directly transfer card information to the wallet, simplifying the setup process.

Data Entry and Verification: Following the card scanning process by the camera, a touch button (1010) allows users to manually enter or verify information, such as security codes, not captured initially. For manually entered card details (1014), users are prompted to confirm all entered information, including card number, expiration date, and CVV code. When adding cards through financial institution integration, the wallet prompts the user to verify the linked account information, ensuring accuracy and security. This verification process may include entering a one-time password (OTP) sent via SMS or email, confirming the card's addition to the wallet. These steps integrate seamlessly with multi-factor security protocols, ensuring that the digital wallet remains a secure and user-centric platform. The digital wallet setup might also involve a step where the user can set preferences for automatic benefit updates or notifications, ensuring they are always informed of the best card to use for specific transactions to maximize rewards and benefits.

Data Storage: Once a card (1016) is scanned and the card details (1014) are obtained by the mobile device (1000), the card details (1014) are verified and stored to a cloud server (1070) as stored object information (1072).

Figure 11:
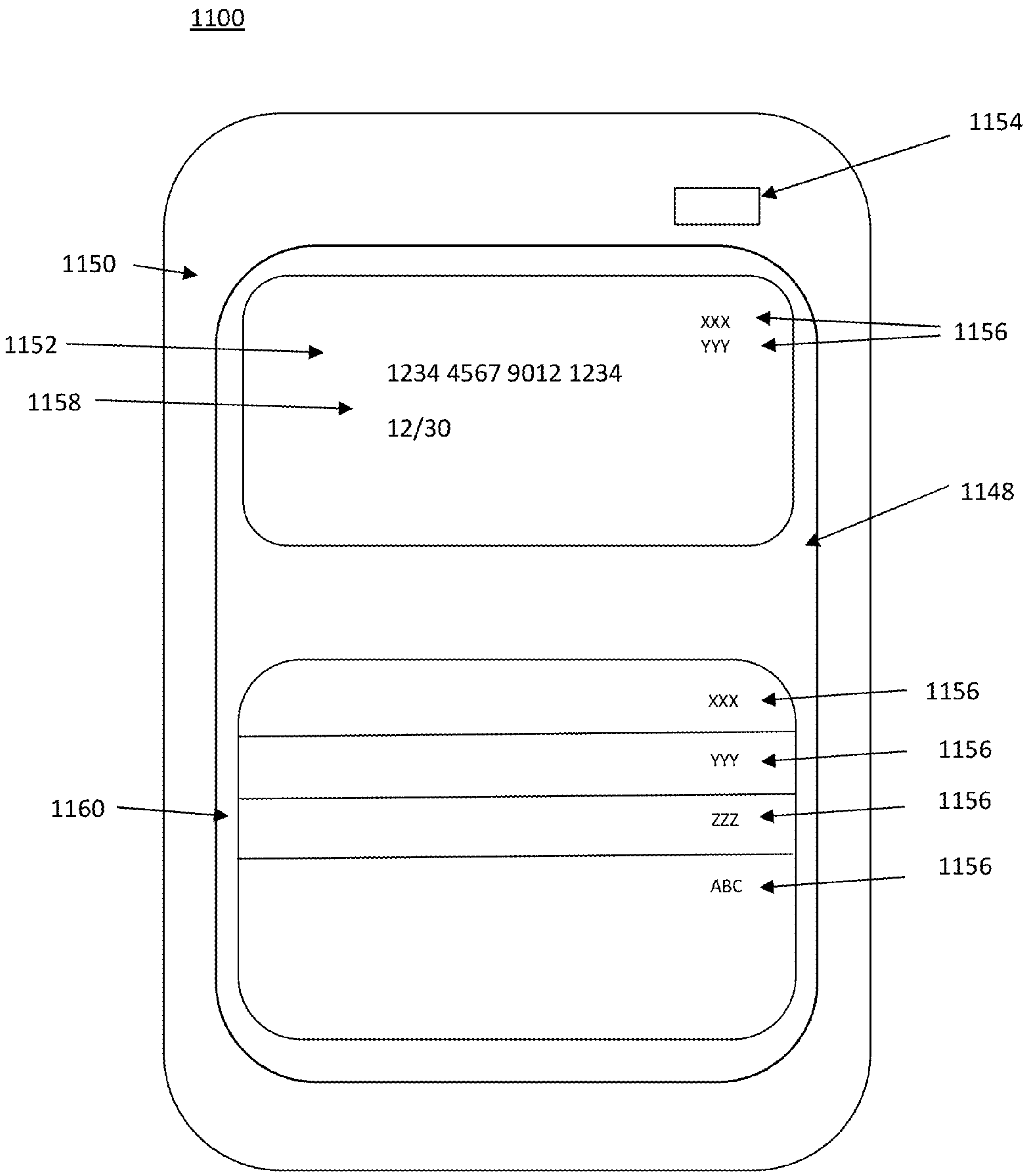
FIG. 11 depicts a front view of an example mobile device that includes a GUI with a digital wallet depicted on the Digital Wallet Purchase Screen, in accordance with an embodiment of the present invention.

FIG. 11 depicts a front view of an example mobile device (1100) that includes a GUI with a digital wallet (1148) depicted on the Digital Wallet Purchase Screen (1150) in accordance with an embodiment of the present invention. In particular, the GUI depicts an example digital wallet purchase screen display (1150), which enables users to select and confirm their payment options. The GUI depicted by the digital wallet purchase screen (1150) serves as a virtual platform, facilitating users to manage and execute digital transactions using digitized cards stored within the device's digital wallet. This interface is essential for presenting updates on card benefits and ensuring a seamless transaction experience. The primary highlight of FIG. 11 is the Digital Wallet Purchase Screen (1150), a user-centric interface designed to streamline the digital purchasing experience. This interface allows users to quickly access stored cards, view benefits, and make informed decisions during transactions.

Emphasized Display of Selected Card: Central to the Digital Wallet Purchase Screen (1150) is the Virtual Card Image (1152) of a virtual card stored to the digital wallet (1148). This digital representation of the Virtual Card Image (1152) portrays the physical card a user intends to use for the transaction. When a transaction is initiated, the card chosen by the user is vividly displayed, ensuring clear understanding and confirmation of the card in use for the transaction. For instance, if a user selects a credit card with dining benefits, the screen prominently displays this card to confirm its use and highlights any applicable dining benefits.

Storing and Showcasing Multiple Cards: The versatility of the digital wallet (1148) permits users to store and manage an array of cards, as evidenced by the depiction of multiple cards (1160). While the Virtual Card Image (1152) dominates the screen, the other stored cards, represented by multiple cards (1160), are shown as condensed icons, perhaps aligned along the screen's edge, signifying alternative financial options within the wallet. This setup for the multiple cards (1160) allows users to quickly switch between cards based on the benefits or rewards they wish to utilize.

Transaction Facilitation via Transmitter: Integral to the purchasing mechanism is the transmitter (1154). Embedded within mobile device (1100), the transmitter (1154) oversees the secure wireless communication necessary for digital transactions. Utilizing technologies like NFC (Near Field Communication), the transmitter (1154) ensures the secure relay of transaction details to the recipient terminal. For example, when making an in-store purchase, the transmitter (1154) securely communicates with the merchant's terminal to process the payment using the selected card.

Displaying Card Attributes and Perks: The Digital Wallet Purchase Screen (1150) diligently incorporates card benefits. Features such as benefits of the card (1156)—which might entail dining discounts or extended warranty protection—are readily accessible. Additionally, other card information (1158), which might include specifics like the card's expiration or the card type (credit/debit), is displayed, offering users an overview before finalizing a transaction. This ensures that users are aware of the benefits available with each transaction.

Interactive and Static graphical user interface (GUI) Elements for Benefits Display: The GUI design incorporates interactive features directly within the card display, enhancing the engagement and user experience for cardholders. These interactive elements allow users to tap or click to uncover more detailed information about the benefits or to navigate directly to services related to these benefits. Conversely, static elements are embedded within the card's visual design, serving as a constant reminder of the available benefits and thereby enhancing the cardholder's awareness and convenience. The system's design ensures that these GUI elements are both versatile and customizable, allowing for a personalized experience that adapts to each cardholder's usage habits and preferences. This integration of dynamic and static elements within the card design effectively merges functionality with personalized user interaction.

Workflow of Digital Wallet Transaction: Engaging in a transaction via the digital wallet, as portrayed in FIG. 11, begins as the user activates the digital wallet (1148) application on mobile device (1100). Users can then choose a card from the roster of multiple cards (1160) or opt for a previously set default card. Once the card is selected and presented as the Virtual Card Image (1152), users can proceed to the transaction phase. The transmitter (1154) interacts with the merchant's terminal, and upon user's authorization, processes the transaction details, culminating in a successful purchase. By shedding light on the nuanced steps of a digital wallet transaction, FIG. 11 encapsulates the optimized capabilities of the mobile device (1100) in facilitating diverse digital transactions. For example, the digital wallet (1148) might highlight the selected card's benefits such as grocery cashback, online shopping cashback, or gas station cashback before the transaction is completed, ensuring the user is informed of their benefits.

Figure 12:
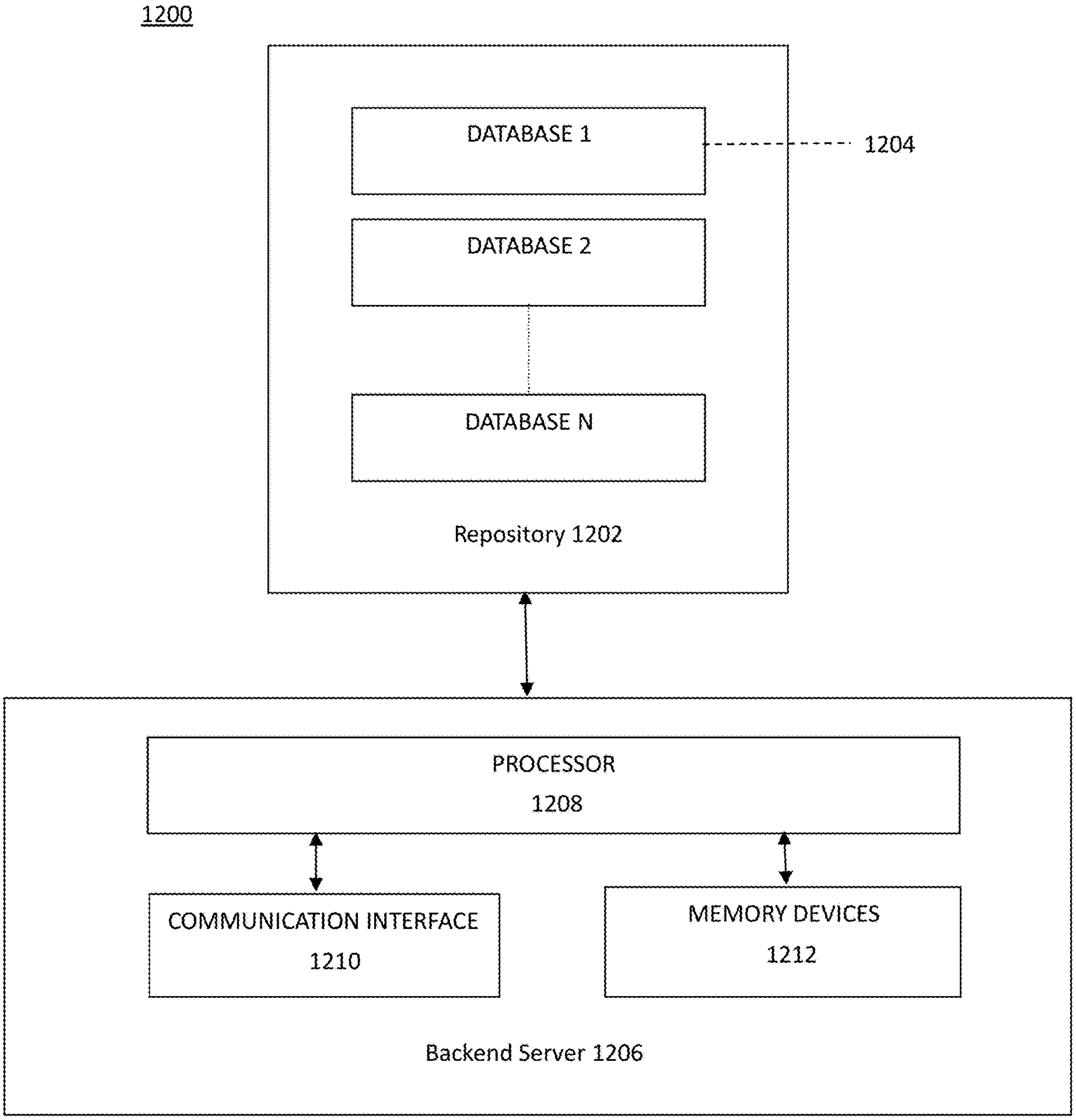
FIG. 12 is a block diagram of an example system-level architecture, in accordance with an embodiment of the present invention.

FIG. 12 is a block diagram of an example system-level architecture (1200), in accordance with an embodiment of the present invention. The example architecture (1200) outlines the enterprise system's potential role in managing and operating the digital wallet, illustrating the interaction between various system components for enhanced data flow and security.

Introduction to System Architecture Facilitating Digital Wallet Operation: FIG. 12 reveals the intricate block diagram of the architecture (1200), conceived as a pivotal part of the enterprise system (see enterprise system 300 of FIG. 1). This system framework is specifically delineated to efficiently operate and manage digital wallets, further emphasizing the strategic coordination among its key components to uphold functionalities such as populating the digital wallet with card details and images, and dynamically displaying associated card benefits.

The Role of Repository and Database in Information Management: Centrally positioned within the architecture is the Repository (1202), which houses the Database (1204). This consolidated storage solution is meticulously designed to handle vast amounts of structured data, ensuring that all pertinent card information, transaction logs, and user-related data remain organized, easily accessible, and securely stored. The Repository (1202) and Database (1204) are interconnected with the Backend Server (1206) through a bidirectional interface, facilitating dynamic data exchange essential for real-time operations. For instance, the system can update and display card benefits in the digital wallet based on the latest transaction data stored in the database.

Backend Server: The Operational Backbone: Positioned as the heart of processing operations, the Backend Server (1206) encapsulates the Processor (1208), Memory Device (1212), and Communication Interface (1210). This server administers and oversees the majority of data processing, retrieval, and management tasks. Within this server, the Processor (1208) is tasked with analyzing, processing, and executing commands essential for the digital wallet's operation, including populating the wallet with real-time card data and images, and executing security protocols. It also handles the dynamic updates of card benefits, ensuring users have access to the most current information regarding their card perks.

Communication Interface: Bridging External Connections: The Communication Interface (1210), integrated within the Backend Server (1206), serves as the gateway for encrypted, stable, and high-speed data transmissions, be it for card information updates, transaction confirmations, or user notifications. This interface (1210) is crucial for maintaining seamless communication between the digital wallet and external systems, ensuring that updates to card benefits and other relevant information are promptly reflected in the wallet.

Ensuring Memory Storage and Quick Retrieval: Also located within the Backend Server (1206), the Memory Device (1212) facilitates temporary storage for quick access and retrieval. This includes caching user preferences, temporarily holding transaction data for quick processing, or storing frequently used card details. This capability supports the efficient display of card benefits, allowing users to quickly see the perks associated with their selected card during transactions.

Dynamic Processing via Dedicated Processor: The Processor (1208), within the Backend Server (1206), possesses advanced capabilities that include analyzing, processing, and executing commands that are crucial for the operation of the digital wallet, reflecting a significant augmentation of the computational prowess of the architecture (1200). It dynamically processes updates to card benefits, ensuring that users receive real-time information on available discounts, cashback offers, and other perks.

Concluding Insights on System Architecture: The vivid depiction in FIG. 12, articulating the architecture (1200), underscores the meticulous design behind the enterprise system (see enterprise system 300 of FIG. 1), catering to the evolving needs of the digital wallet. Each block, be it for storage, processing, or communication, works in symphony, ensuring that users of the digital wallet experience seamless, secure, and efficient operations. This comprehensive system architecture supports the continuous enhancement of the digital wallet, particularly in managing and displaying card benefits, thereby optimizing user engagement and satisfaction.

Figure 13:
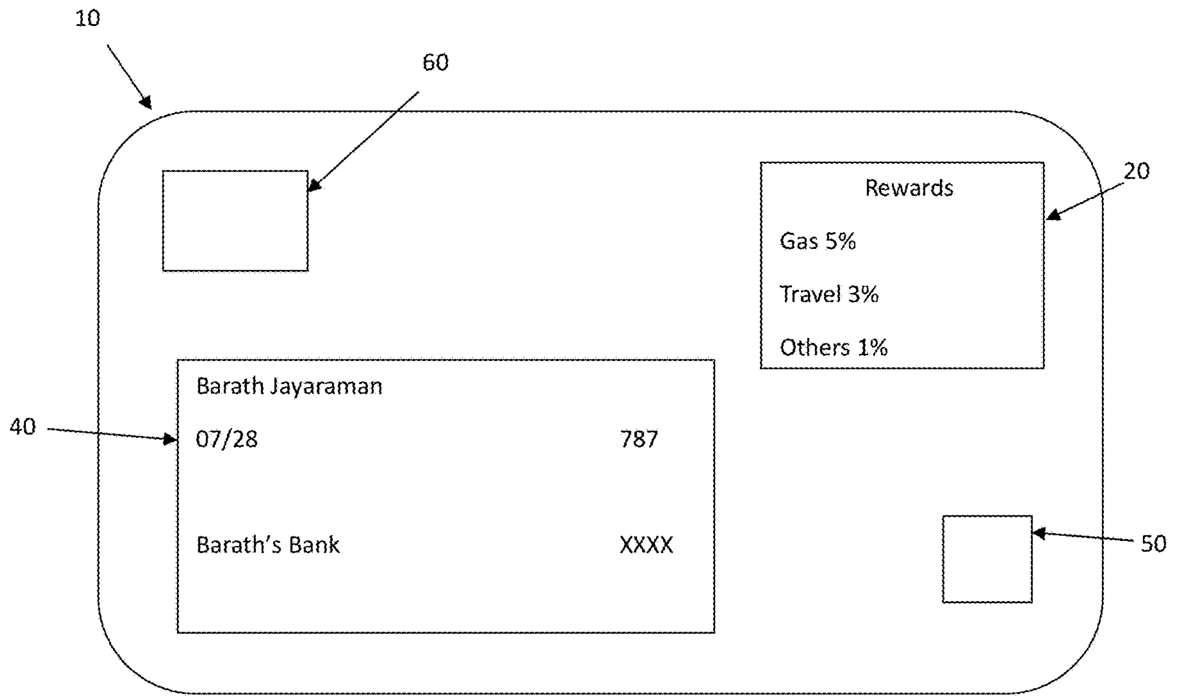
FIG. 13 is a front view of an example physical card, capable of being generated using the systems and methods disclosed herein, that is associated with benefits, in accordance with an embodiment of the present invention.
Figure 14:
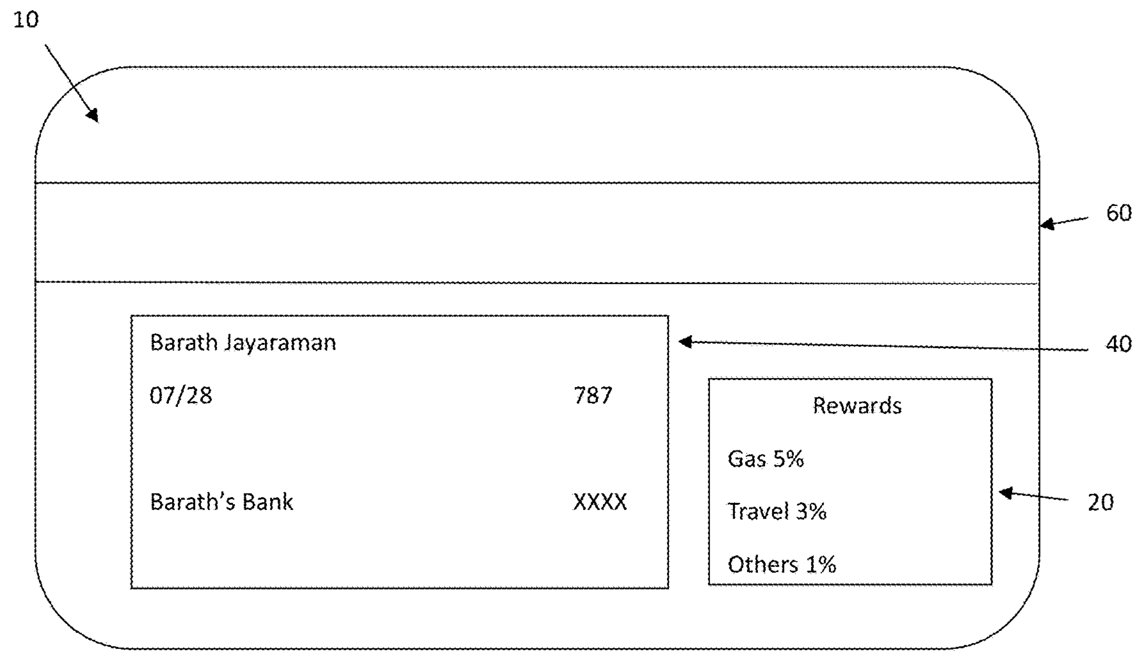
FIG. 14 is a back view of an example physical card, capable of being generated using the systems and methods disclosed herein, that depicts a removable indicator associated with benefits, in accordance with an embodiment of the present invention.

FIGS. 13 and 14 depict respective front and back views of an example physical card, capable of being generated using the systems and methods disclosed herein, that is associated with benefits, in accordance with an embodiment of the present invention. FIGS. 13 and 14 elucidate the intrinsic features and details that contribute to its functionality and aesthetic appeal. As the physical embodiment of a financial instrument, the card in FIG. 13 and FIG. 14 incorporate several crucial elements, each tailored to deliver a distinct purpose.

The Anatomy of Physical Card: Traditionally, cards have been crafted from durable plastic material, but in the modern era, choices have expanded. The physical card (10) may be formed from materials such as stainless steel, aluminum, and even sustainable composites, each bringing its unique aesthetic and tactile experience. The design and layout of the card (10) are meticulously curated not only to resonate with the issuing entity's brand identity but also to signify the card's tier or category. The material choice, in particular, can often indicate the premium nature of the card or its alignment with eco-friendly initiatives. Regardless of the material, each card is equipped with distinct security features and details that facilitate its manifold operations.

Highlighting Card Benefits: Clearly demarcated on the card's surface is the section for Card Benefits (20). This section provides a succinct overview of the advantages and perks associated with the card. Depending on the card type, such as a credit or debit card, these benefits can range from cashback offers, reward points, travel miles, or exclusive discounts.

Accommodating Additional Card Details: Adjacent to the benefits lies the Other Card Information section (40). This segment typically includes details such as the bank's name, payment processor name like VISA, Mastercard, cardholder's name, the card's expiry date, and potentially a member or card ID. Such information assists in identifying the card's legitimacy and its association with the rightful owner.

Integrating Advanced Security Features: Modern cards often integrate a Chip (50), a tiny yet pivotal component embedded into the card's surface. This microchip stores encrypted user information and enhances transaction security by generating a unique code for each transaction. The presence of the chip provides an additional layer of security, reducing the chances of card duplication or fraudulent activities.

Facilitating Contactless Transactions: Incorporated into some advanced card versions is the Transmitter (60). This technology enables contactless transactions, allowing cardholders to merely tap or hover their card near a point-of-sale terminal to complete a transaction. This feature not only expedites the payment process but also reduces physical contact, catering to modern hygiene and convenience standards.

Essential to the Functionality: The Magnetic Strip or "magstripe" (60) is distinctly captured by the back view of the Physical Card (10) in FIG. 14. It's important to acknowledge the presence of a magnetic strip (60) typically located on the card's reverse side. This magnetic strip (60), embedded with essential transactional data, facilitates electronic processes, allowing the card to interact with various payment systems. Sometimes the other card information (40) and reward details (20) can also be present in the back of the card (10).

Concluding Insights on Physical Card Structure: The detailed explanation of FIGS. 13 and 14 offers a comprehensive understanding of the multi-faceted nature of the physical card (10). Whether utilized for conventional swiping or advanced contactless transactions, the card's intricate design, coupled with its security features, assures cardholders of a seamless and secure transaction experience.

Figure 15:
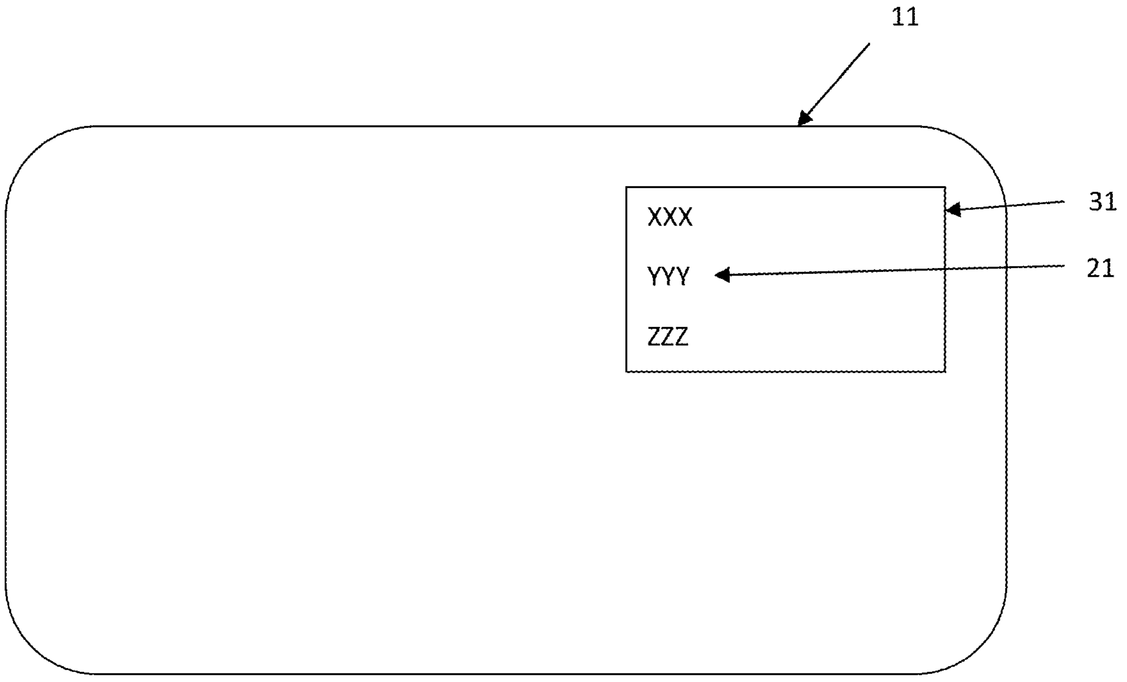
FIG. 15 depicts a perspective view of an example physical card, in accordance with an embodiment of the present invention.

FIG. 15 depicts a perspective view of an example physical card (11), in accordance with an embodiment of the present invention. The physical card (11) includes a removable indicator (31) such as a removable sticker. In one embodiment of the invention, a removable sticker (31) with the benefits (21) listed is provided to the customers to be placed on the card. FIG. 15 illustrates either the front or back of the card as a removable sticker (31) with the benefits (21) listed can be placed on either side of the physical card (11). In some embodiments, the sticker (31) will be sent when customer is issued a new card as part of the card application being approved. When an existing customer requested a replacement of a card, a sticker will be sent along with the replaced card. When the benefit of the card changes after certain time period, customers will be sent a new sticker with the updated benefits. Customer can also request for a replacement of a sticker as required. Customer can either opt for the default list of benefits to be listed on the sticker or can choose the list and the order of the benefits to be displayed on the sticker that will be placed in the card. For example, customer might be primarily using their card for purchasing groceries since the card got the cash back benefits on groceries purchase. In another example, customer might be using the card for primarily rental car collision protection which some cards offers. They might want only the rental car insurance benefit to be listed as benefits in their benefit sticker since customer can make sure that they are using the card when renting the card. Customer can customize the font style, size and color of the benefits to be displayed. Benefits can also be displayed as pictorial representation instead of using words. For example, airline benefit can be displayed as picture of an airplane with 2% next to it representing 2% cash back on airplanes ticket purchase.

In another embodiment, the invention extends to a virtual card image (sec Virtual Card Image 1152 of FIG. 11) in the digital wallet (see digital wallet 1148 of FIG. 11), where the benefits display (see benefits of the card 1156 of FIG. 11) can be integrated into the card's representation on digital platforms such as banking apps or digital wallets. This involves software that can display the benefits in a user-friendly manner. The virtual card can reflect changes in benefits automatically on the digital wallet card design, ensuring that users always have the latest information. The software can be designed to be compatible across various operating systems and devices, ensuring the cardholder can view and understand their benefits wherever they access their virtual card. It is also envisaged that the virtual card system can incorporate machine learning algorithms to personalize and optimize the display of benefits based on the cardholder's usage history and preferences.

In one embodiment of the invention, customers are given the option to request a physical card with or without the benefits printed directly on the card. This customization allows for a tailored user experience, where customers can choose a card design without benefits displayed on it or opt for one that visually displays the benefits, such as cash back percentages, points, or special offers. For instance, a customer may prefer a card without any benefit information for a sleeker look or choose to have specific benefits printed directly on the card for quick reference. Additionally, for virtual cards within the digital wallet, the system provides an option to toggle the benefits display on or off. This functionality allows users to manage the visual clutter in their digital wallet interface and view card benefits only when needed. When the toggle is on, the benefits are displayed alongside the virtual card in an interactive GUI format, which can include not only text but also icons or graphical representations of the benefits. For example, an airline benefits might be shown as an airplane icon with a text overlay indicating "2% cashback on flight bookings."

In both physical and virtual cards, the benefits display (see benefits display 20 of FIGS. 13 and 14) is envisioned to be highly customizable. Cardholders can have the flexibility to choose which benefits they want to be prominently displayed, and how they are presented. This can be managed through an associated app or web interface. For example, a cardholder who frequently travels might choose to highlight air miles or travel insurance benefits, while another cardholder who often dines out may prefer to see restaurant discounts or dining rewards at the forefront. This customizable and dynamic nature of the benefits display makes it easy for cardholders to keep track of and fully utilize their benefits, which can significantly enhance the cardholder's experience.

Additionally, embodiments of the invention provide a unique way of enhancing the benefits usage through the application of advanced data analytics. The system could incorporate machine learning algorithms and predictive analytics to monitor a cardholder's spending patterns and behavior. This data could then be used to tailor the benefits display to individual cardholders, providing personalized benefit recommendations. For instance, if the system identifies that a cardholder frequently shops at a certain store, it could highlight relevant discounts or cashback offers at that store. Alternatively, if the system detects that a cardholder often makes online purchases from a specific e-commerce platform, it could display targeted benefits such as cashback or extended warranty offers. This proactive approach to managing and displaying benefits would significantly simplify the process for cardholders, leading to increased benefit utilization and overall satisfaction with the card services.

The system identifies the benefits associated with each card using several methods. Firstly, the system can utilize the full or partial card number to query the backend system where the benefits information is stored. In case of the virtual cards in the digital wallet, the system can use an image of the card to extract the bank and card name, then query the backend system to retrieve the benefit details. Additionally, if the benefits information is stored in a separate database from the bank's database, the backend system will connect with the bank's database via API calls to get updated benefits. This can be done individually for single cards or through periodic bulk file transfers that include benefits information for multiple cards associated with the same bank.

For virtual cards in the digital wallet, the system can use merchant code matching to identify potential benefits during transactions, leveraging user profiles and preferences for personalized benefits, and connect directly to the card issuer's database for real-time or periodic updates. Integration with third-party data aggregators provides a centralized source of benefits data by collecting and managing information from multiple card issuers and loyalty programs. Importantly, the system permits manual updates to benefits information, which can be initiated by the customer through the digital wallet interface or by system administrators if the automated updates prove to be insufficient or if the benefits information is incomplete. This manual intervention capability ensures that users can directly adjust or verify their card benefits as needed. Additionally, the system can use subscription service APIs to retrieve detailed benefits information specific to premium cards, such as exclusive travel perks or higher cashback rates offered by the subscription services. Furthermore, querying loyalty program databases ensures that benefits associated with loyalty points, rewards, and other program-specific perks are accurately displayed. These methods ensure that the cardholder always has access to accurate and up-to-date benefits information, regardless of the card issuer or storage method.

In order to maintain the security and privacy of the cardholder, the benefits display (see benefits display 20 of FIGS. 13 and 14) system includes robust security measures. For physical cards, the electronic display is designed to show only non-sensitive information related to card benefits, not revealing any personal or financial data that could be exploited if the card is lost or stolen. For virtual cards, the system is designed to adhere to all relevant data protection and privacy standards. Data used for personalized recommendations is anonymized and processed securely, ensuring cardholder's personal and transactional data is kept private and secure.

Enhanced Interactivity through QR Codes: Embodiments of the invention extend to include a benefits display (see benefits display 20 of FIGS. 13 and 14) that provides interactive features, enhancing user engagement with card benefits. For physical cards, this is achieved by incorporating QR codes, each encoded with a unique identifier. When a customer scans the QR code using a mobile device's camera, it triggers a secure query to the backend system, which then retrieves either general or personalized benefits associated with the card or account. The system dynamically generates a list of benefits, displayed back on the mobile device in an engaging, interactive format. This method allows cardholders to access a tailored display of benefits directly through a standard camera scan, enhancing convenience and encouraging broader usage and interaction with the card's features. For virtual cards, interactivity is seamlessly integrated, including features like pop-up descriptions and clickable links to display more details about the rewards, alongside interactive progress bars for tracking benefit usage.

Enhanced Dynamic Benefit Display during Online Purchases: In certain embodiments of the invention, when a cardholder initiates a transaction on an online platform, such as a retail, travel, or any other type of website, and selects a digital wallet for payment, the digital wallet is configured to recognize the platform from which the transaction is initiated. This recognition can occur through mechanisms that detect the URL or through API calls that convey the platform's identity. Once the platform is identified, the digital wallet consults a database to retrieve specific benefits applicable to each card stored within the wallet for transactions conducted on this platform. The wallet then displays these benefits dynamically, allowing the cardholder to select the most advantageous card for the transaction. This process enhances the user's shopping experience by providing tailored benefit options that maximize value based on the transaction context.

In one embodiment of the invention, the system receives input of an intended transaction amount and retrieves data corresponding to cashback percentages for multiple credit cards stored in a user's digital wallet. The processor calculates potential cashback earnings for each card by applying the respective cashback percentage to the transaction amount. These calculations are then displayed on a user interface prior to completing the purchase transaction. The user interface includes a toggle switch, allowing the user to activate or deactivate the display of potential cashback earnings. When active, the user can view a comparative display of potential earnings across different cards and select the card that offers the highest return for the specific transaction.

Embodiments of the invention offer an innovative and comprehensive approach to managing and displaying card benefits. It takes into consideration the need for customization, interactivity, security, and education, all aimed at maximizing the cardholder's satisfaction and benefit utilization.

Furthermore, embodiments of the invention can be implemented in a variety of settings and applications. Financial institutions can incorporate the benefits display (see benefits display 20 of FIGS. 13 and 14) system into their card production process, either as a standard feature on all cards or as an added-value feature on premium cards.

The system can be designed to accommodate changes in the benefits structure over time. This flexibility allows the card issuer to update the benefits in response to market trends, promotional offers, or adjustments in their rewards programs. Cardholders will automatically sec these changes on their card's display for virtual cards. For physical cards, customers can receive a new card with the benefits listed or opt for a sticker with updated benefits that can be placed on the card.

Embodiments of the invention envisages a system to manage the dynamic display of benefits for physical cards through stickers. These removable indicators (see removable indicator 31 of FIG. 15), are designed to be durable, customizable, and easy to affix to the physical card (see physical card 11 of FIG. 15). They can be made available in various formats to accommodate different preferences, such as a broad overview or detailed list of benefits, and may be color-coded or use symbols for ease of understanding. The system allows for these stickers to be distributed via mail, bank branches, or downloadable for self-printing through a web and mobile platform, providing a versatile and user-friendly solution for updating and displaying card benefits.

Expanding on the sticker system, a digital interface within the card issuer's mobile and web applications allows cardholders to request a new benefits sticker on-demand. This feature enables cardholders to receive an updated sticker whenever there are significant changes to their benefits. Cardholders can customize their stickers through this platform, choosing which benefits to highlight and the format of the information.

Furthermore, when a new card is issued or an existing card is replaced, the system is designed to accommodate two options for including a benefits sticker. First, the benefits sticker can be automatically attached to the mailed card, ensuring that cardholders have immediate access to their benefits information without the need to manually apply the sticker themselves. This provides convenience and enhances the user experience from the start. Alternatively, the sticker can be sent along with the new card, allowing customers to attach it themselves if they prefer. This option gives cardholders the flexibility to customize the placement or decide whether to use the sticker at all, catering to personal preferences regarding their card's appearance.

Embodiments of the invention present a solution to the challenge of underutilized card benefits. By providing a system and method for displaying these benefits in an accessible, clear, and engaging manner, the cardholder's experience is greatly enhanced. The detailed descriptions provided herein are illustrative, and variations and modifications within the scope of this invention would be apparent to those skilled in the art.

Embodiments of the invention have been described with a degree of specificity for the purposes of illustration. It should be understood that numerous modifications, variations, and adaptations may be made by those skilled in the art without departing from the spirit and scope of the invention.

The benefits display (see benefits display 20 of FIGS. 13 and 14) serves not only as a tool to enhance the cardholder's experience but also provides indirect benefits to card issuers. It can improve customer loyalty, increase card usage, and potentially enhance revenue through increased transaction volume. It can also serve as a marketing tool to promote new benefits or partnerships, offering a personalized and visible way for issuers to communicate with cardholders.

In terms of production and implementation, the system is designed to be cost-effective and scalable. The components required for the display are readily available and affordable, making it feasible to incorporate into a large number of cards. The sticker system and virtual card software can be developed and updated centrally, allowing for efficient deployment across all platforms.

For card issuers, the system could be introduced gradually, starting with a pilot program for a select group of cardholders. This approach allows issuers to gather feedback and make necessary adjustments before a full rollout, ensuring the system is adaptable and can be refined based on user feedback and evolving needs.

Advantageously, aspects of the invention facilitate enhancing functionality and user experience. For physical cards, options are available to align the appearance of the printing benefits or the stickers with the overall design of the card, including color-matching and complementary designs that do not detract from the card's appearance.

For virtual cards, the benefits display may adapt to the look and feel of the digital platform where the card is hosted.

This ensures a consistent user experience by using similar color schemes, fonts, and design elements of the host platform.

Finally, embodiments of the invention not only add functional value to the card but also enhance its aesthetic appeal. The inclusion of a benefits display can make the card more attractive and interesting to use, further encouraging cardholders to take advantage of their benefits.

The practical considerations of implementing the benefits display system are also taken into account. For physical cards, the printing benefits are designed to be durable and resistant to damage. The sticker system uses high-quality materials that withstand daily wear and tear and are easy to apply and remove without leaving residue.

For virtual cards, the benefits display operates efficiently without compromising the performance of the app or digital wallet where the card is hosted. Regular updates to the display's software ensure compatibility with new operating systems and devices, integrating advanced features or improvements to maintain usability and engagement.

Embodiments of the invention provide a comprehensive, flexible, and user-friendly solution for displaying card benefits. It significantly enhances the cardholder's experience and offers substantial benefits to card issuers, potentially transforming the way card benefits are managed and utilized.

Figure 16:
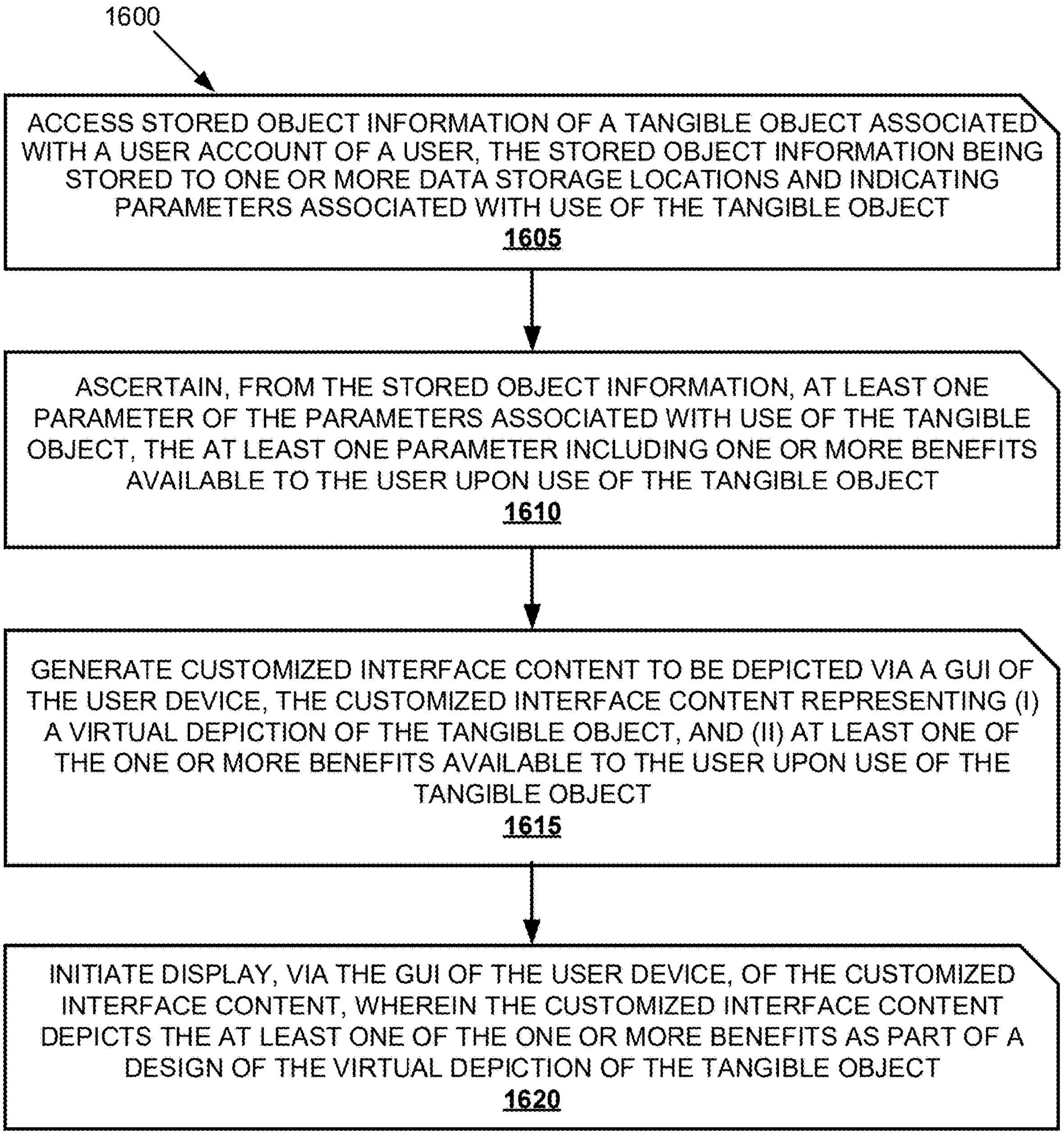
FIG. 16 depicts a block diagram of an example method, in accordance with an embodiment of the present invention.

FIG. 16 depicts a block diagram of an example method 1600, in accordance with an embodiment of the present invention. At block 1605, the system accesses stored object information, such as card benefit information, of a tangible object, such as a physical credit or debit card, associated with a user account of a user. The stored object information is stored to one or more data storage locations and indicates parameters (e.g., type of benefits, an amount of the benefit, a time period for benefit applicability, etc.) associated with use of the tangible object (e.g., physical credit or debit card). At block 1610, the system ascertains, from the stored object information, at least one parameter of the parameters associated with use of the tangible object, the at least one parameter including one or more benefits available to the user upon use of the tangible object or a virtual version of the tangible object, wherein the use of the tangible object facilitates a resource exchange from the user account to an external location such as a third party account in order to obtain a product or service. At block 1615, the system generates customized interface content to be depicted via a graphical user interface (GUI) of the user device, the customized interface content representing (i) a virtual depiction of the tangible object, and (ii) at least one of the one or more benefits available to the user upon use of the tangible object or the virtual version of the tangible object. At block 1620, the system initiates display, via the GUI of the user device, of the customized interface content, wherein the customized interface content depicts the at least one of the one or more benefits as part of a design of the virtual depiction of the tangible object. In some embodiments, the method 1600 further includes authenticating user credentials received from the user device. In some embodiments, the method 1600 includes providing, based on the authenticating, the user device with access to the user account via a digital wallet. The customized interface content is, in some embodiments, displayable via the digital wallet.

In some embodiments, the customized interface content includes multiple benefits available to the user upon use of the tangible object or a virtual version of the tangible object. In such embodiments, the content of the benefits listed in the benefits display is customized based on the cardholder's usage patterns. Accordingly, the method 1600 further includes analyzing user history data of the user to ascertain one or more usage patterns associated with the user's use of the tangible object. Further, the system derives, from the user history data, preferred benefits of the user from the multiple benefits available to the user. In some embodiments, the system also prioritizes the multiple benefits available to the user according to the derived preferred benefits to produce a highest ranked derived benefit. The method 1600 may also in a selected subset of the multiple benefits into the customized interface content, the selected subset including the highest ranked derived benefit. In some embodiments, the system dynamically modifies the customized interface content in response to changes in the one or more usage patterns. In some embodiments, the benefits display on the virtual card includes a dynamic element that automatically adjusts the display of the benefits in real time in response to the cardholder's usage patterns to optimize relevance and engagement. Accordingly, the system may dynamically modify the parameters in accordance with changes to benefit availability.

In some embodiments, the benefits display on the virtual card is updated automatically and electronically in real-time as the benefits associated with the card change. In some embodiments, the benefits display includes a feature to allow the cardholder to rank the benefits based on their personal preference, indicating the relative importance of each benefit irrespective of its frequency of use. In some embodiments, the customized interface content includes multiple benefits available to the user upon use of the tangible object or the virtual version of the tangible object. The system may receive one or more user inputs selecting the user's preferred benefits from the multiple benefits available to the user. Further, the system may incorporate a selected subset of the multiple benefits into the customized interface content, the selected subset being ranked in accordance with the user's preferred benefits.

In some embodiments, the benefits display on the virtual card includes enhanced interactive elements to enable the cardholder to engage with and explore the benefits in a detailed and interactive manner. Accordingly, the customized interface content includes at least one control input selected from the group consisting of a hyperlink, an interface slider, and a dropdown menu, the at least one control input facilitating access to detailed explanation of the one or more benefits.

In some embodiments, the benefits display on the virtual card includes a mechanism to alert the cardholder directly within the card design about benefits that are nearing expiration, thereby encouraging timely utilization of said benefits. Accordingly, the one or more benefits may have a limited duration, and the system determines that the one or more benefits will be expiring within a predefined number of days due to the limited time duration. The system may also distribute, via the network, one or more alerts to the user device, the one or more alerts indicating expiration of the one or more benefits.

In some embodiments, the customized interface content is configurable in response to a user input to toggle between depicting the at least one of the one or more benefits and obscuring depiction of the at least one of the one or more benefits. In some embodiments, the benefits display may enable the cardholder to request a physical card with or without the benefits displayed, to maintain the aesthetic of the card.

In some embodiments, the system receives a request to generate and initiate distribution of the tangible object depicting the design to one or more geographic locations (e.g. addresses for delivery of the tangible object), the design depicting the at least one of the one or more benefits. The system may also transmit, to one or more computing devices, instructions to generate production of the tangible object with the design of the tangible object depicting the at least one of the one or more benefits In some embodiments, the customer can scan a QR code on the physical card using a mobile device, which navigates the customer to a webpage displaying the card benefits, enhancing interactive engagement. Accordingly, the request further indicates selection of an option for a QR code to be included in the design, the QR code being configured with data modules encoding data that, when scanned by a camera, generate display of information associated with the one or more benefits.

In some embodiments, the customer can manually choose the display order of the benefits display on the physical and virtual card, allowing the cardholder to customize how benefits are visually prioritized on the card based on personal preferences and immediate needs, independently of automated system recommendations. Accordingly, the system may receive an indication from the user device selecting the at least one of the one or more benefits available to the user that is to be depicted by the customized interface content.

Figure 17:
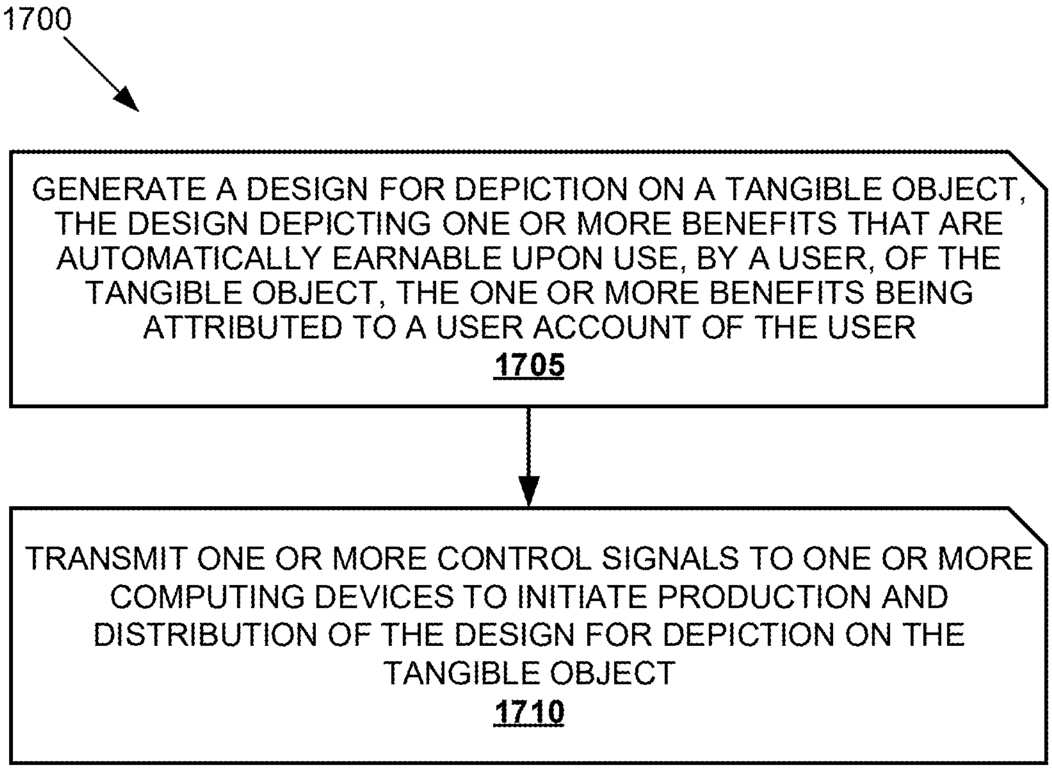
FIG. 17 depicts a block diagram of an example method, in accordance with an embodiment of the present invention.

FIG. 17 depicts a block diagram of an example method 1700, in accordance with an embodiment of the present invention. The method 1700 enables card benefits to be displayed on a physical card, such as a credit or debit card. A benefits indicator or display is integrated either onto a sticker or embedded into the card itself and lists the benefits associated with using the card. At block 1705, the system generates a design for depiction on a tangible object, the design depicting one or more benefits that are automatically earnable upon use, by a user, of the tangible object, the one or more benefits being attributed to a user account of the user. At block 1710, the system transmits one or more control signals to one or more computing devices to initiate production and distribution of the design for depiction on the tangible object. In some embodiments, the tangible object is a physical card and the one or more benefits are imprinted or otherwise displayed directly on a surface of the physical card.

In some embodiments, the design is a removable indicator and the tangible object is a physical card, wherein the removable indicator is capable of being adhered to a surface of the physical card and the one or more benefits are depicted on a surface of the removable indicator. Accordingly, in some embodiments, the removable indicator is a removable sticker that is adhered to a surface of the physical card and lists the card benefits. In some embodiments, a new sticker is automatically sent to customers on a periodic basis based on the longevity of the sticker's usability or when the benefits associated with the card change. Thus, the method 1700 may establish an automated protocol to reinitiate the production and the distribution of the removable indicator according to a predefined schedule. In some embodiments, the predefined schedule is based on a predicted longevity of the removable indicator. In other embodiments, the predefined schedule is based on periodic changes to the benefits.

In some embodiments, the customer can request for a sticker with benefits listed using a mobile application, web platform, or by contacting a call center. Thus, the method 1700 can include receiving a request to reinitiate the transmitting of the one or more control signals to initiate the production and the distribution of the removable indicator.

In some embodiments, the customer can request, using a mobile application, web platform, or by contacting a call center, to cease receiving a sticker with benefits listed, with options for either a permanent discontinuation or a temporary suspension. The method 1700 can include terminating the automated protocol in response to a request from the user device.

In embodiments in which the one or more benefits are imprinted on a surface of the card itself, rather than a sticker, the method 1700 may include establishing an automated protocol to reinitiate the production and the distribution of the tangible object when one or more benefits change. In some embodiments, the method 1700 receives a request to reinitiate the transmitting of the one or more control signals to initiate the production and the distribution of the removable indicator.

Figure 18:
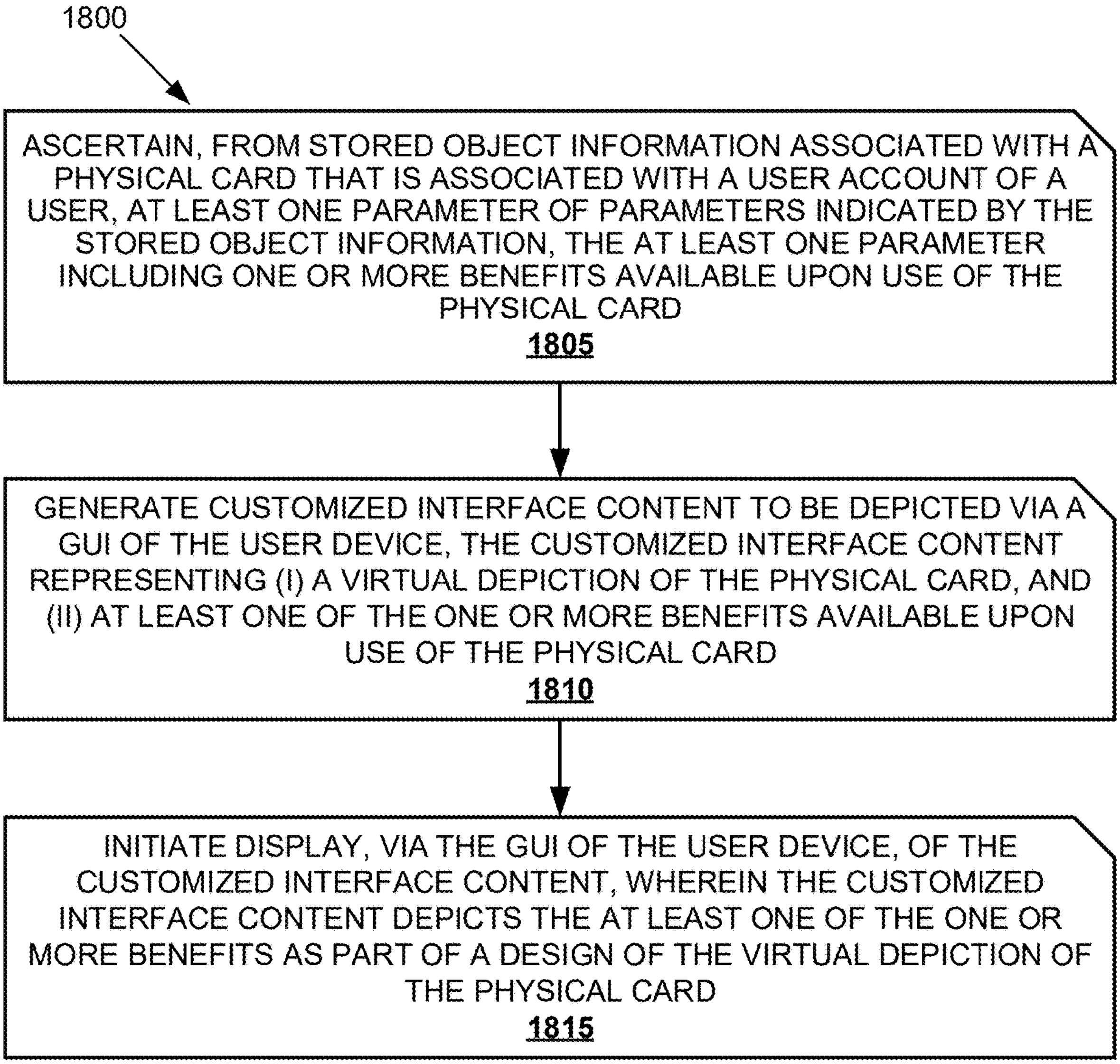
FIG. 18 depicts a block diagram of an example method, in accordance with an embodiment of the present invention.

FIG. 18 depicts a block diagram of an example method 1800, in accordance with an embodiment of the present invention. At block 1805, the method includes ascertaining, from stored object information associated with a physical card that is associated with a user account of a user, at least one parameter of parameters indicated by the stored object information, the at least one parameter including one or more benefits available upon use of the physical card or a virtual version of the physical card. At block 1810, the system generates customized interface content to be depicted via a GUI of the user device, the customized interface content representing (i) a virtual depiction of the physical card, and (ii) at least one of the one or more benefits available upon use of the physical card or a virtual version of the physical card. At block 1815, the system initiates display, via the GUI of the user device, of the customized interface content, wherein the customized interface content depicts the at least one of the one or more benefits as part of a design of the virtual depiction of the physical card. In some embodiments, the design is capable of being printed directly on the physical card, and the method further includes transmitting, to one or more computing devices, instructions to generate production of the physical card with the design depicting the at least one of the one or more benefits. In some embodiments, the method 1800 further includes analyzing usage patterns to determine which of the one or more benefits to be included as part of the design.

In some embodiments, the user account is accessible via a digital wallet, and the customized interface content is displayable via the digital wallet. In some embodiments, the customized interface content includes a control input enabling the user to select which of the one or more benefits to be included as part of the design, the one or more benefits being selectable from a predefined list. The one or more benefits may then be applied to either the virtual card or to a physical card.

In some embodiments, the method 1800 includes training a machine learning model to predict which of the one or more benefits should be included in the at least one of the one or more benefits as part of the design based on a benefit's relevance to a specific user, the training including iteratively predicting a target variable as part of a training and testing loop and adjusting weights applied to input nodes during each iteration to improve predictability of the target variable. The method 1800 may also include deploying the trained machine learning model. User data of the user account may then be applied to the deployed machine learning model, and based thereon the method 1800 may include analyzing (i) a usage history of the physical card, and (ii) benefit utilization patterns. Further, the method 1800 may include predicting which of the one or more benefits to be included as the at least one of the one or more benefits to be depicted as part of the design in accordance with relevance to the user. In some embodiments, generating of the customized interface content is based on the user data being applied to the machine learning model. In some embodiments, machine learning algorithms may be used to analyze the cardholder's transaction history and benefit utilization patterns to predict and display benefits deemed most relevant based on factors including usage frequency and benefit expiration, thereby enhancing personalized engagement with the card.

In some embodiments, the customized interface content includes benefit utilization information associated with the one or more benefits, the benefit utilization information indicating an accumulated output derived from the one or more benefits that are automatically earnable upon use of the physical card or a virtual version of the physical card, the accumulated output indicating a percentage of a benefit utilized in accordance with predefined criteria. For instance, within the virtual card interface, the usage information for each benefit may be displayed, where the usage information is presented adjacent to or in association with the corresponding benefit displayed on the virtual card. In some embodiments, the usage information for each benefit may include both the accumulated monetary value and the percentage of the benefit utilized or remaining. This usage information is presented adjacent to or in association with the corresponding benefit displayed on the virtual card, wherein the percentage display calculates the proportion of the benefit utilized based on predefined criteria such as spending limits or total eligible transactions, thereby providing a real-time overview of both financial gains and remaining benefits.

In some embodiments, the method 1800 may also include utilizing predictive analytics to update the customized interface content, the predictive analytics incorporating a plurality of variables in order to determine which of the one or more benefits to depict as part of the at least one of the one or more benefits of the design, the plurality of variables including at least one selected from the group consisting of frequency of usage of the physical card, locations of usage of the physical card, location of the user, a time of the month, the user's age, and personally identifiable information of the user. In some embodiments, the predictive analytics are used to adapt the benefits display based on a comprehensive analysis of the cardholder's behavior and contextual factors. This analysis includes not only historical transaction data but also considers the cardholder's location, time of the month, age, and other personal data, to dynamically tailor the benefits display to anticipate and meet the cardholder's specific needs at any given time.

In some embodiments, the cardholder is allowed to select a preferred language for the benefits display on either the physical or virtual card. Thus, according to one embodiment, the customized interface content includes a selectable control input for selecting a preferred language for depicting the one or more benefits.

In some embodiments, the method 1800 further includes receiving a request to generate and initiate distribution of the physical card depicting the design to one or more geographic locations, the embedded design depicting the at least one of the one or more benefits. Further, instructions may be transmitted to one or more computing devices to generate production of the tangible object with the design of the tangible object depicting the at least one of the one or more benefits. In some instances, the receiving of the request is based on opening of the user account of the user. In some examples, the design of the physical card further depicts benefit information of the one or more benefits, and the request is received due to the physical card needing to be replaced. The card may need to be replaced if the card is lost, misplaced, expired, or other changes are made to the user account.

In some embodiments, the virtual depiction of the physical card is one of a plurality of virtual depictions of multiple physical cards that are depicted in a stack, where each of the multiple physical cards are associated with the user, wherein the customized interface content further includes a selectable control input for overlaying a benefit summary of associated benefits of each of the multiple physical cards. For example, each of the virtual cards may correspond to a credit or debit card owned by the user, and an option may be provided to overlay a summary of all benefits directly on each card within the stack view, such that all benefits are visible when the cards are displayed collectively. In some embodiments, the benefit summary depicts a subset of all of the associated benefits, the subset being limited to highest ranked benefits applicable to the user.

The benefits display on the virtual card may dynamically adjust to display benefits associated with the specific online platform from which a transaction is initiated, the system configured to detect the online platform, retrieve applicable benefits for each card stored within the digital wallet, and display these benefits on the virtual card interface, thereby allowing the cardholder to select the optimal card based on the benefits most relevant to the current transaction. For example, the stored object information may include platform specific information, the parameters include platform-specific benefits, and the customized interface content further represents a specific online platform from which the ascertaining of the at least one parameter is initiated, wherein the at least one of the one or more benefits include a platform-specific benefit.

In some embodiments, in the event that benefit details are unavailable for a particular card, the system shall display a message indicating that it is unable to retrieve or display the reward details.

In some embodiments, the systems disclosed herein may facilitate managing rewards and benefits information on virtual cards in a digital wallet, by leveraging an image capture feature that automatically identifies and extracts reward details embedded in the physical card's design or presented as a sticker, and integrates these details into the corresponding card's digital representation within the digital wallet. For instance, in one embodiment, the method 1800 further includes obtaining the stored object information from the user device based on the user device obtaining the stored object information via an image capture device of the user device, the stored object information being obtained based on the image capture device extracting card data during capturing an image of the physical card. In some embodiments, the digital wallet provides an interface allowing users to manually input or edit benefit details for any card within the wallet, with changes reflected in the card's virtual display. In some embodiments, the digital wallet periodically scans existing virtual card entries to update benefit details based on new information extracted from the physical card's image or entered manually by the user. In some embodiments, each physical card includes a QR code that, when scanned by the digital wallet, automatically transmits detailed information about the card's benefits directly into the digital wallet. Thus, the image of the physical card may include a QR code that includes data modules encoding data that associated with the one or more benefits. The detailed information that is automatically transmitted may include automatically updating the stored object information according to a periodic updating schedule.

In some embodiments, the design of the virtual depiction of the physical card is modified in real time based on the ascertaining being initiated from a platform associated with obtaining a product or service online, the design being modified to include potential realizable benefits if the product is obtained using the physical card. In some embodiments, the customized interface content further includes benefit comparisons among multiple physical cards including the physical card.

Figure 19:
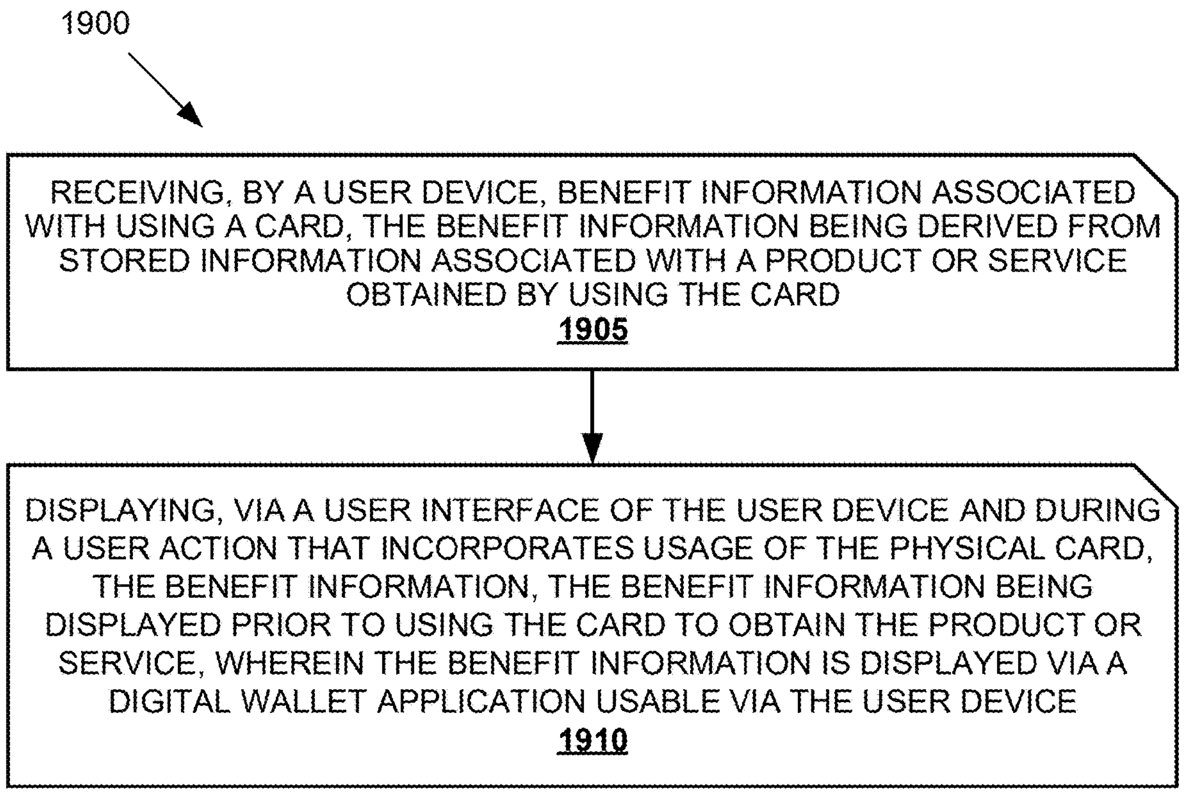
FIG. 19 depicts a block diagram of an example method, in accordance with an embodiment of the present invention.

FIG. 19 depicts a block diagram of an example method 1900, in accordance with an embodiment of the present invention. At block 1905, a user device receives benefit information associated with using a card, the benefit information being derived from stored information associated with a product or service obtained by using the card. At block 1910, the user device displays, via a user interface and during a user action that incorporates usage of the physical card, the benefit information, the benefit information being displayed prior to using the card to obtain the product or service. The benefit information is displayed via a digital wallet application usable via the user device.

In some embodiments, the stored information is selected from the group consisting of a merchant code, a transaction description, and a URL. In some embodiments, the stored information is stored to one or more locations selected from the group consisting of a local database, a database of an issuer of the card, and a third-party website.

In particular, the user device may display rewards associated with a credit card during online transactions, wherein the transaction category is determined using merchant codes, transaction descriptions, or URLs, and the categorization is utilized to retrieve and display the corresponding rewards benefits for the purchase. The user device may categorize transactions using merchant codes, detailed transaction descriptions, or URLs to accurately identify the transaction type. Based on this categorization, it retrieves rewards data from local databases, the card issuer's database, or third-party websites specializing in financial rewards. This data, which includes cashback percentages, bonus points, and exclusive promotional offers, is dynamically displayed at the digital wallet's payment interface in real-time, ensuring cardholders receive detailed and actionable benefits information at the moment of purchase.

Certain aspects of the invention are depicted with reference to flowcharts or block diagrams. It is to be understood that each block of the flowchart illustrations and/or block diagrams, and combinations of blocks in the flowchart illustrations and/or block diagrams, can be implemented by computer readable program instructions that may be provided to a processor of a general purpose computer, special purpose computer, or other programmable data processing apparatus.

In the flowchart illustrations and/or block diagrams disclosed herein, each block in the flowchart/diagrams may represent a module, segment, or portion of instructions, which comprises one or more executable instructions for implementing the specified logical function(s). In some implementations, the functions noted in the blocks may occur out of the order noted in the Figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs.

The structures, materials, acts, and equivalents of all means or step plus function elements in the claims below, if any, are intended to include any structure and/or material for performing the function in combination with other claimed elements. The descriptions are not intended to be exhaustive or limited to the invention in the form disclosed. Many modifications and variations will be apparent to those of ordinary skill in the art without departing from the scope and spirit of the invention.

What is claimed is:

1. A computing system for tangible object design generation, comprising:
- at least one processor;
- a communication interface communicatively coupled to the at least one processor; and
- a memory device storing executable code that, when executed, causes the processor to perform:
  - training a machine learning model, wherein the training configures the machine learning model to predict a subset of benefits to graphically represent to a user as part of a design for depicting on a tangible object;
  - using the machine learning model, including:
    - loading into the machine learning model user data of an account of the user as values for input features of the machine learning model; and
    - receiving from the machine learning model a prediction of one or more benefits attributed to the account of the user and selected from a plurality of benefits associated with use of the tangible object and attributed to the account of the user, for graphical representation as part of the design for depicting on the tangible object; and
  - printing the design with included graphical representations of the one or more account-attributed benefits for depicting on the tangible object.

2. The system of claim 1, wherein the tangible object is a physical card and the printing prints the graphical representations of the one or more account-attributed benefits on a surface of the physical card.

3. The system of claim 1, wherein the printing prints the design on a removable indicator, and the tangible object is a physical card, and wherein the removable indicator is configured as a sticker for adherence to a surface of the physical card, and the graphical representations of the one or more account-attributed benefits are depicted on a surface of the removable indicator.

4. The system of claim 3, wherein the executable code, when executed, further causes the processor to perform: establishing an automated protocol that reinitiates the and printing the design on the removable indicator according to a predefined schedule.

5. The system of claim 4, wherein the predefined schedule is based on a predicted longevity of the removable indicator.

6. The system of claim 4, wherein the predefined schedule is based on periodic changes to the benefits.

7. The system of claim 4, wherein the executable code, when executed, further causes the processor to perform terminating the automated protocol in response to a request from a user device.

8. The system of claim 3, wherein the executable code, when executed, further causes the processor to perform:

receiving a request to reinitiate the using the machine learning model and the printing the design, and;

reinitiating the using the machine learning model and the printing the design, wherein the reinitiating the using the machine learning model results in an updated prediction by the machine learning model that produces a change in the one or more account-attributed benefits to include for graphical representation for depiction on the tangible object, and the reinitiating the printing the design prints an updated design that includes graphical representations of the changed one or more account-attributed benefits.

9. A method, comprising:

training a machine learning model, wherein the training configures the machine learning model to predict a subset of benefits to graphically represent to a user as part of a design for depicting on a tangible object;

using the machine learning model, including:

loading into the machine learning model user data of an account of the user as values for input features of the machine learning model; and receiving from the machine learning model a prediction of one or more benefits attributed to the account of the user and selected from a plurality of benefits associated with use of the tangible object and attributed to the account of the user, for graphical representation as part of the design for depicting on the tangible object; and printing the design with included graphical representations of the one or more account-attributed benefits for depicting on the tangible object.

10. The method of claim 9, wherein the tangible object is a physical card, and wherein the printing prints the graphical representations of the one or more account-attributed benefits on a surface of physical card, and wherein the method further includes establishing an automated protocol that reinitiates the printing the design when an updated prediction by the machine learning model produces a change in the one or more account-attributed benefits to include for graphical representation for depiction on the physical card, and the reinitiated printing prints an updated design that includes graphical representations of the changed one or more account-attributed benefits.

11. The method of claim 9, wherein the printing prints the design on a removable indicator configured as a sticker for adherence to a surface of the tangible object.

12. The method of claim 11, further comprising establishing an automated protocol that reinitiates the using the machine learning model and the printing the design.

13. The method of claim 12, further comprising:

receiving a request to reinitiate the using the machine learning model and the printing the design, and reinitiating the using the machine learning model and the printing the design, wherein the reinitiating the using the machine learning model results in an updated prediction by the machine learning model that produces a change in the one or more account-attributed benefits to include for graphical representation for depiction on the tangible object, and the reinitiating the printing the design prints an updated design that includes graphical representations of the changed one or more account-attributed benefits.

* * * * *